US011397745B1

(12) United States Patent
Hemingway

(10) Patent No.: US 11,397,745 B1
(45) Date of Patent: Jul. 26, 2022

(54) SYSTEM AND METHOD FOR DETERMINING RANKINGS, SEARCHING, AND GENERATING REPORTS OF PROFILES AND PERSONAL INFORMATION

(71) Applicant: Grant Carter Hemingway, Dallas, TX (US)

(72) Inventor: Grant Carter Hemingway, Dallas, TX (US)

( * ) Notice: Subject to any disclaimer, the term of this patent is extended or adjusted under 35 U.S.C. 154(b) by 0 days.

(21) Appl. No.: 16/831,798

(22) Filed: Mar. 26, 2020

Related U.S. Application Data

(60) Provisional application No. 62/824,197, filed on Mar. 26, 2019.

(51) Int. Cl.
*G06F 16/25* (2019.01)
*G06F 16/2457* (2019.01)

(52) U.S. Cl.
CPC ...... *G06F 16/258* (2019.01); *G06F 16/24578* (2019.01)

(58) Field of Classification Search
CPC .................. G06F 16/258; G06F 16/24578
See application file for complete search history.

(56) References Cited

U.S. PATENT DOCUMENTS

| | | | |
|---|---|---|---|
| 5,692,501 A | 12/1997 | Minturn | |
| 5,895,453 A | 4/1999 | Cook | |
| 6,078,866 A | 6/2000 | Buck et al. | |
| 6,321,228 B1 | 11/2001 | Crandall et al. | |
| 6,493,702 B1 | 12/2002 | Adar et al. | |
| 6,546,389 B1 | 4/2003 | Agrawal et al. | |
| 6,687,691 B1 | 2/2004 | Agrawal et al. | |
| 6,694,303 B1 | 2/2004 | Agrawal et al. | |
| 6,931,403 B1 | 8/2005 | Agrawal et al. | |
| 7,031,961 B2 | 4/2006 | Pitkow et al. | |
| 7,080,064 B2 | 7/2006 | Sundaresan | |
| 7,089,237 B2 | 8/2006 | Turnbull et al. | |
| 7,099,859 B2 | 8/2006 | Sundaresan | |
| 7,257,577 B2 | 8/2007 | Fagin et al. | |
| 7,584,181 B2 | 9/2009 | Zeng et al. | |
| 7,630,919 B1 | 12/2009 | Obrecht | |
| 7,752,553 B2 * | 7/2010 | Pennington | G06Q 10/10 715/751 |
| 7,958,018 B2 | 6/2011 | Obrecht | |
| 8,265,778 B2 | 9/2012 | Taylor et al. | |
| 8,312,035 B2 | 11/2012 | Zeng et al. | |
| 8,346,782 B2 | 1/2013 | Zhang et al. | |
| 8,423,459 B1 | 4/2013 | Green et al. | |
| 8,553,191 B2 | 9/2013 | Cohen et al. | |
| 8,620,948 B2 | 12/2013 | Atsmon et al. | |
| 8,630,210 B2 | 1/2014 | Timmer et al. | |
| 8,661,403 B2 | 2/2014 | Sullivan et al. | |
| 8,738,522 B2 | 5/2014 | Green et al. | |

(Continued)

*Primary Examiner* — Jay A Morrison
(74) *Attorney, Agent, or Firm* — Hemingway & Hansen, LLP; D. Scott Hemingway; Elizabeth P. Hartman

(57) ABSTRACT

This invention is a system and method that supports peer to peer interactions, in which users rate themselves and others, using a review-based system and algorithm-oriented search engine. The algorithm locates and displays users through a set list of parameters via the search engine. After locating the profile, the user can become more informed about their search or publish a report on the search, then utilize their newfound knowledge in their upcoming meeting to their benefit.

31 Claims, 10 Drawing Sheets

(56) References Cited

U.S. PATENT DOCUMENTS

| | | | |
|---|---|---|---|
| 8,799,058 | B2 | 8/2014 | Golembiewski |
| 8,826,202 | B1 | 9/2014 | Goel et al. |
| 8,831,754 | B2 | 9/2014 | Taylor et al. |
| 8,838,586 | B2 | 9/2014 | Waldman et al. |
| 8,874,556 | B2 | 10/2014 | Lunt et al. |
| 8,935,245 | B1* | 1/2015 | Cionca ............... G06F 16/248 707/732 |
| 8,949,252 | B2 | 2/2015 | Chittar et al. |
| 8,972,442 | B2 | 3/2015 | Atsmon et al. |
| 9,001,706 | B2 | 4/2015 | Timmer et al. |
| 9,268,826 | B2 | 2/2016 | Atsmon et al. |
| 9,460,193 | B2 | 10/2016 | Ghani et al. |
| 9,508,084 | B2 | 11/2016 | Sullivan et al. |
| 9,690,937 | B1 | 6/2017 | Duchin et al. |
| 10,210,534 | B2 | 2/2019 | Sullivan et al. |
| 10,394,826 | B1 | 8/2019 | Viswanathan |
| 10,452,528 | B2 | 10/2019 | Shankar et al. |
| 10,534,783 | B1 | 1/2020 | Raczko et al. |
| 10,579,371 | B2 | 3/2020 | Agarwal et al. |
| 10,733,241 | B2 | 8/2020 | Govindarajan et al. |
| 10,749,748 | B2 | 8/2020 | Auvenshine et al. |
| 10,776,732 | B2 | 9/2020 | Guha et al. |
| 2013/0332319 | A1* | 12/2013 | Zuber .................... G06Q 10/10 705/27.1 |
| 2014/0337120 | A1* | 11/2014 | Ercanbrack ........ G06Q 30/0244 705/14.43 |
| 2015/0169774 | A1* | 6/2015 | Budzienski ....... G06F 16/24578 707/734 |
| 2019/0075168 | A1* | 3/2019 | Goldfarb ............. H04L 63/0272 |

* cited by examiner

US 11,397,745 B1

SYSTEM AND METHOD FOR DETERMINING RANKINGS, SEARCHING, AND GENERATING REPORTS OF PROFILES AND PERSONAL INFORMATION

CROSS REFERENCE TO RELATED APPLICATIONS

This application claims the benefit of U.S. Provisional Patent Application 62/824,197, filed Mar. 26, 2019.

STATEMENT REGARDING FEDERALLY SPONSORED RESEARCH OR DEVELOPMENT

Not applicable.

TECHNICAL FIELD OF INVENTION

This invention relates to the field of evaluation of memory allocations and information content to sort, rank, search and generate automated reports on profiles and personal information.

BACKGROUND OF THE INVENTION

Computers and computer networks have transformed the society and the work environment since their introduction in mass to the business community and the consuming public. The impact we see today on the way business is conducted and consumers interact with service providers and product retailers is rooted in the technological developments in the recent past. In the 1960s, the Defense Department developed a communication system that would permit communication between these different computer networks.

Recognizing that a single, the Defense Department recognized that developing a centralized communication system would be vulnerable to attacks or sabotage, so the Defense Department required that their new communication system be decentralized with no critical services concentrated in vulnerable failure points. In order to achieve this goal, the Defense Department established a decentralized communication protocol for communication between their computer networks. A few years later, the National Science Foundation (NSF) established a communication system that facilitated communication between incompatible network computers at various research institutions across the country. The NSF adopted the Defense Department's protocol for communication, and this combination of research computer networks would eventually evolve into the Internet.

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet. The IP standard identifies the types of services to be provided to users and specifies the mechanisms needed to support these services.

The IP standard also specifies the upper and lower system interfaces, defines the services to be provided on these interfaces, and outlines the execution environment for services needed in the system. A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device. Because standard protocols are used in Internet communications, the IP protocol on the destination communication device decodes the transmitted information into the original information transmitted by the originating device.

A router, agent or gateway is used to regulate the transmission of information packets into and out of the computer network. Routers interpret the logical address contained in information packet headers and direct the information packets to the intended destination. Information packets addressed between computers on the same network do not pass through the router to the greater network, and as such, these information packets will not clutter the transmission lines of the greater network. If data is addressed to a computer outside the network, the router forwards the data onto the greater network.

Mobile communications and cellular telephony systems have become smaller, lighter, and more powerful, which improved the ability to communicate with individuals on an exponential basis. The Internet protocols were originally developed with an assumption that Internet users would be connected to a single, fixed network. With the advent of cellular wireless communication systems, such as mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a Mobile Node. Typically, a Mobile Node maintains connectivity to its home network through a foreign network. The Mobile Node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

Profile records and feedback information are often saved in a specialized format on local data processor and storage servers. The storage format for profile records and feedback information can be composed of records, files and profile information. The format for profile records and feedback information used is often stored in a non-standardized and inconsistent format for profile records and feedback information. The inconsistency between stored profile records formats makes sharing profile records and feedback information over a standardized communication platform quite problematic.

SUMMARY OF THE INVENTION

The present invention is a system and method that supports real-time, immediate peer to peer interactions, allows the rating of users using a review-based system and algorithm-oriented processing system. A search engine and automatic ranking is conducted by the system processors based on data traffic flow determinations and algorithms using a set list of parameters. After locating the profile, the user can become more informed about their search or publish a report on the search, then utilize their newfound knowledge in their upcoming meeting to their benefit.

The present invention is a system and method for monitoring data traffic transmissions associated with profile records and feedback information communications to the computer system using a computer processor on the computer network, which collects network data and compares the data traffic transmissions against predetermined threshold levels to automatically determine which profile records and feedback information associated with particular users are the most popular and visited in the database. The system and method automatically rearranges and sorts the display of the user identification on a real-time, immediate basis associated with the profiles and feedback information that exceed the predetermined threshold level, with an automatic ranking of those profile records and feedback information of higher data traffic to lower data traffic use that signifies most popular profiles to least poplar profiles. The system includes a controller that repeatedly measures the data transmission levels on the system, and sends control signals to the processor to generate messages to users regarding the ranking of profiles and sends control signals to the display to display the rearranged ranking of the profile records and feedback information based on the processing and analysis ranking.

The present invention is a system and method that includes one or more memory storage units, a display, interface devices, and one or more processors coupled to one or more memory storage units programmed with executable instructions for real-time, immediate monitoring data traffic transmissions associated with profile records and feedback information communications to the computer system, collecting network data and compares the data traffic transmissions against predetermined threshold levels to automatically determine on a real-time, immediate basis which profile records and feedback information associated with particular users are the most popular and visited in the database, and automatically rearranging and sorting the display of the user identification associated with the profiles and feedback information that exceed the predetermined threshold level, with an automatic ranking of those profile records and feedback information of higher data traffic to lower data traffic use that signifies most popular profiles to least poplar profiles.

The present invention is a hardware processor-based system and method having an indexing and referential storage that collects, converts and consolidates profile records and feedback information from various sources into a standardized format. The present invention is a system and method for storing profile records and feedback information in a standardized format, so it can be accessed remotely over the Internet without converting or accessing a particular specialized format on local data processor and storage servers. The standardized storage format used in the present invention includes converting all profile records and feedback information, such as records, files and profile information, allowing remote access to such standardized storage of profile records and feedback information. The format for profile records and feedback information is stored in a standardized and consistent format for profile records and feedback information. The present invention solves the problems associated with inconsistent stored profile records formats by allowing remote access to profile records and feedback information over a standardized communication platform.

The present invention is a specialized hardware processor-based system and method, which includes specialized data processor and storage readable medium and subprograms that is not available in a generic computer device, even though a user/provider can access the system through a standard web browser on a computing device or connection to the Internet on a single or multi-tier network. The method provides a graphical user interface (GUI) by a content server, which is hardware or a combination of both hardware and software. A user can be given remote access through the GUI to view, search, sort or input profile records and feedback information using the user's own local device (e.g., a personal data processor and storage or wireless handheld device) or another interface device.

The present invention is a system and method having a first hardware data processor coupled to a plurality of non-transitory storage devices and one or more input/output ports coupled to one or more input/output devices on a home hardware data processor subsystem, wherein the first hardware data processor is capable of execution of one or more subprograms, and the first hardware data processor makes a real-time, immediate determination about a data traffic determination based on the first hardware data processor analysis from profile records and feedback information stored in one or more of the plurality of non-transitory storage devices. The analysis is conducted according to a relationship rules subprogram having one or more relationship rules and a pre-filter subprogram, and the analysis uses the relationship rules subprogram and the pre-filter subprogram to determine level of traffic data flow and whether data traffic exceeds a threshold level as associated with particular profile records and feedback information. In the system and method of the invention, the first hardware data processor receives and transmits electronic communications from one or more input/output ports.

The system of the invention also has a transceiver subsystem coupled to the first hardware data processor through one or more input/output ports to provide a communications interface for communications between the first hardware data processor and one or more users. One or more input/output port provides access to the first hardware data processor and one or more of the plurality of non-transitory storage devices coupled to the first hardware data processor.

BRIEF DESCRIPTION OF THE DRAWINGS

The objects and features of the invention will become more readily understood from the following detailed description and appended claims when read in conjunction with the accompanying drawings in which like numerals represent like elements and in which:

The objects and features of the invention will become more readily understood from the following detailed description and appended claims when read in conjunction with the accompanying drawings in which like numerals represent like elements.

DETAILED DESCRIPTION

Figure 1A:
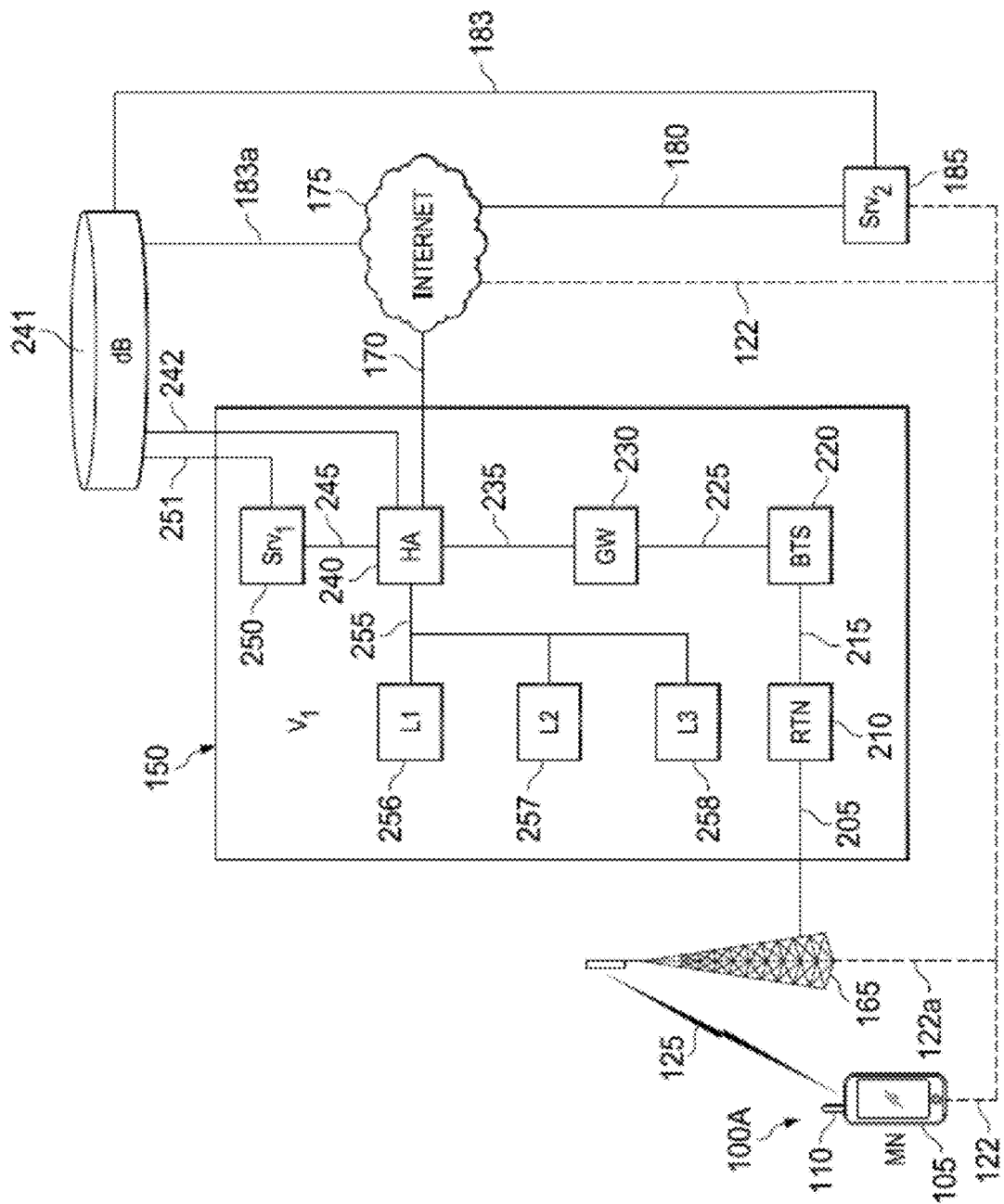
FIGS. 1A, 2A and 3A are block diagrams showing system components used with the present invention.

The present invention is a system and method that supports real-time, immediate peer to peer interactions, allows the rating of users using a review-based system and algorithm-oriented processing system. A search engine and automatic ranking is conducted by the system processors based on data traffic flow determinations and algorithms using a set list of parameters. After locating the profile, the user can become more informed about their search or publish a report on the search, then utilize their newfound knowledge in their upcoming meeting to their benefit.

The present invention in FIGS. 1A-3A is a specialized hardware processor-based system and method, which includes specialized data processor and storage readable medium and subprograms that are not available in a generic computer device, even though a user/provider accesses the system through a standard web browser on a computing device or client connected to the Internet or single or multi-tier network. The system and method provides a graphical user interface (GUI) by a content server, which is hardware or a combination of both hardware and software. A user can be given remote access through the GUI to view or update information about a profile record and feedback information relating to personal information, experiential feedback, and communications regarding a particular individual or user. When a user wants to update the profile record or feedback information, the user can input the update in any format used by the user's local device.

The present invention is a system and method for monitoring data traffic transmissions associated with profile records and feedback information communications to the computer system using a computer processor on the computer network, which collects network data and compares the data traffic transmissions against predetermined threshold levels to automatically determine which profile records and feedback information associated with particular users are the most popular and visited in the database. The system and method automatically rearranges and sorts the display of the user identification on a real-time, immediate basis associated with the profiles and feedback information that exceed the predetermined threshold level, with an automatic ranking of those profile records and feedback information of higher data traffic to lower data traffic use that signifies most popular profiles to least poplar profiles. The system includes a controller that repeatedly measures the data transmission levels on the system, and sends control signals to the processor to generate messages to users regarding the ranking of profiles and sends control signals to the display to display the rearranged ranking of the profile records and feedback information based on the processing and analysis ranking.

The present invention is a system and method that includes one or more memory storage units, a display, interface devices, and one or more processors coupled to one or more memory storage units programmed with executable instructions for real-time, immediate monitoring data traffic transmissions associated with profile records and feedback information communications to the computer system, collecting network data and compares the data traffic transmissions against predetermined threshold levels to automatically determine on a real-time, immediate basis which profile records and feedback information associated with particular users are the most popular and visited in the database, and automatically rearranging and sorting the display of the user identification associated with the profiles and feedback information that exceed the predetermined threshold level, with an automatic ranking of those profile records and feedback information of higher data traffic to lower data traffic use that signifies most popular profiles to least poplar profiles.

The present invention is a hardware processor-based system and method having an indexing and referential storage that collects, converts and consolidates profile records and feedback information from various sources into a standardized format. The present invention is a system and method for storing profile records and feedback information in a standardized format, so it can be accessed remotely over the Internet without converting or accessing a particular specialized format on local data processor and storage servers. The standardized storage format used in the present invention includes converting all profile records and feedback information, such as records, files and profile information, allowing remote access to such standardized storage of profile records and feedback information. The format for profile records and feedback information is stored in a standardized and consistent format for profile records and feedback information. The present invention solves the problems associated with inconsistent stored profile records formats by allowing remote access to profile records and feedback information over a standardized communication platform.

The present invention is a system comprising a hardware data processor coupled to a plurality of non-transitory storage devices and one or more input/output ports coupled to one or more input/output devices, said hardware data processor capable of execution of one or more subprograms, said hardware data processor receives, through said input/output, profile records and feedback information in a standardized data format using a hardware data processor coupled to a plurality of non-transitory storage devices, said hardware data processor stores said profile records and feedback information in said standardized format in one or more of said plurality of non-transitory storage devices; and said hardware data processor transmits an electronic communication through said input/output ports to one or more users regarding profile records and feedback information stored in said standardized format in one or more of said plurality of non-transitory storage devices.

The file data storage system and method, as well as the standardization of formatted profile record and feedback information, in the present invention enhances the performance and increases the efficiency of the present invention over known data processor and storage methods and systems through the storage of standardized formatted profile record and feedback information from input profile records and feedback information. The hardware processor-based system and method uses an indexing and referential storage and specialized subprograms that uses hardware processor-based storage devices to collect and consolidate profile records and feedback information provided by different sources and different formats.

Additionally, the input/output port provides remote access to said profile record and feedback information via a graphical user interface coupled to said hardware data processor that is coupled to one or more of said plurality of non-transitory storage devices so that said profile records and feedback information can be input, accessed and modified into non-transitory memory storage; and, said hardware data processor coupled to said one or more of said plurality of non-transitory storage devices makes determinations and evaluations of traffic data flow to automatically, on an immediate real-time basis, rankings of users associated with the profile records and feedback information.

The present invention is shown by block diagrams in FIGS. 1A-3A is a communication system supporting the processing communications between a home agent network and one or more mobile units, where the home network has a home agent coupled to a computer server. The home network processes communications to be transmitted and received from one or more mobile units, and a transceiver unit is coupled to say home agent network for receiving and transmitting communications to said mobile unit. The home network processes communications to and from said mobile unit, and information related to the mobile nodes location and proximity can be used to include selected communications that possess information and data relating to profile records and feedback information. The present invention automatically, on an immediate real-time basis, ranks, rearranges, sorts, correlates and associates various profile records and feedback information, as well as supporting integrated data sharing to others.

The home network can communicate via wireless transmission or a wired communication link to the mobile node, the Internet, other computer servers or other foreign or associated home networks. Each of the home network embodiments shown in FIGS. 1A-3A support a Wi-Fi connection (or similar mobile network connection) that allows the pushing of data onto the hand-held mobile device. The invention can use the device's Wi-Fi or cellular connection to activate notification message to selected personnel based on the mobile unit's geographic location or proximity to the person associated with the profile record and feedback information.

The networks shown in FIGS. 1A-3A support the entry of profile records and feedback information into the system, which these systems conduct real-time automated filtering and evaluation of feedback entered for mature language content as well as ranking of popularity based on data traffic flows exceeding predetermined thresholds. A real-time notifications can be transmitted to said selected users, or the subject of any feedback entry. And, if the feedback is negative, the invention embodied in these networks provide automated evaluation and filtering of the feedback information with real-time notifications to selected personnel so the information can be reviewed and contested by the subject of the review.

Profile reports can be accessed by internal or external users or members within an entity; or, alternatively, profile reports can be accessed by external users or other persons so that information can be accessed on a restricted or limited basis, or available to the public. FIGS. 1A-3A provide benchmark information and trending information that can be developed and provided in notifications to individuals associated with the profile records or feedback submissions. Each of these additional components, functionalities and steps, when combined with the attributes, components and steps described immediately above, are considered to be novel because each individually enhances the operation of the computer system over that of a generic computer system. Moreover, the ordered sequence of steps in the methods described herein, with the additional components, functionalities and steps and with the addition of the subsequent location recognition steps, is believed to be novel in that the ordered combination of steps transforms the claims into patent-eligible subject matter.

With reference of FIG. 1A, the communication system 100A of the present invention is shown with a detailed explanation of the system components available at the home network 150 as coupled via communication line 205 to the mobile radio transceiver/cellular/WIFI systems 165 as coupled to mobile node 105. The mobile node 105 includes a hand-held mobile unit 105 that includes a processor, memory and a power source, as well as a transceiver and antenna 110. While a mobile unit is contemplated, lap top, fixed location computers, or computer pads can also be used instead and freely substituted with the mobile unit 105.

The transceiver and antenna 110 supports radio transmission communications link 125 to an radio transceiver antenna and transmission network 165 (e.g. Wi-Fi, cellular, GSM, Evdo, 4G/LTE, CDMA, or others), which is coupled via connection 205 to a radio transmission network communication gateway 210 associated with the home network 150. The mobile hand-held unit 105 may also be connected to an outside server computer SRV2 185 via a separate connection 122, which can include a wireless radio connection or a wireline communication system connection. The mobile hand-held unit 105 may also be connected to the Internet 175 via the communication link 180 through outside server computer SRV2 185 or via a separate direct connection 122, which can include a wireless radio connection or a wireline communication system connection.

The mobile hand-held unit 105 can also be coupled to the radio transceiver antenna 165 and a radio transmission network that is coupled to a telecommunications system that supports connectivity 122a to the Internet 175 or another system network without interfacing directly with equipment or components in the home network 150.

The radio transmission network 210 is coupled to a base station transceiver unit 220 via connection 215, where the base station transceiver station provides an interface between radio domain communications and data communications carried over a telecommunications or network computer system. The base station transceiver unit 220 is coupled to a gateway 230 for the network at the home network 150 via connection 225, which provides an interface with the network maintained at the home network 150 or associated with the home network 150. The BTS 220 may also be located remotely from the home network near the remote radio transmission network 165 accessed by the mobile unit 105.

The gateway 230 is coupled to a home agent 240 via connection 235, where the home agent 240 controls communication flow and directions on the network maintained at the home network 150 or in a network associated with the home network 150. The home agent 240 is coupled to a computer server SRV1 250 via connection 245, which maintains past historical and present real-time information, software module, operations software, or other data that may be used or communicated using the invention. The invention contemplates centrally located servers to maintain the software modules and database information at the home network 150 that maintain or provide access to information related to the home network 150, but remotely located servers and computer networks can also be accessed and used with the invention.

The home agent 240 is coupled to the Internet 175 via a connection 170, and the Internet 175 may be coupled to one or more servers SRV2 185 via connection 180. The mobile hand-held unit 105 may also be connected to SRV2 185 via a separate connection 122, which can include a wireless radio connection or a wireline communication system connection. A database 241 is coupled to the home agent 240 via communication link 242 or computer server 250 via link 251 or computer server SrV2 185 directly via link 183 or indirectly through the Internet 175 via communication links 183a and 180. The database 241 may maintain information related to the users profile records and feedback information, but it could also maintain remote access to software modules and database information used with the software operated by the present invention as well as database information related the business operations. While only one database 241 is shown, this representation is understood to include one or more separate databases and storage locations of data and information.

The file data storage database 241 in FIG. 1A stores data in a standardized format for profile record and feedback information, and that format in the present invention enhances the performance and increases the efficiency of the present invention over known data processor and storage methods and systems through the storage of standardized formatted profile record and feedback information from input profile record and feedback information, files and profile record and feedback information in the hardware processor-based system and method and the use of an indexing and referential storage and specialized subprograms that uses hardware processor-based storage devices to collect and consolidate profile record and feedback information provided by different sources and different formats.

The database 241 in the present system and method enhances the performance and increases the efficiency of the present data processor and storage system network over known data processor and storage methods and systems by the use of an indexing and referential storage. The database 241 is used with the specialized subprograms to generate/transmit notifications, as well as generate/transmit and receive profile record and feedback notifications and messages. The present invention stores data in the database 241 in a more efficient and effective manner than previously used in other data storage systems through the use of an enhanced performance data storage sub-system using a self-referential, indexed data storage protocol and procedure that store all entity types in a single table after indexing is performed to prevent the creation of duplicative data entries in the data storage sub-system. The indexing protocols and procedures used in the enhanced data storage sub-system of the present invention reviews input data (received in health level 7 or HL7 format), The present invention's use of an enhanced performance data storage sub-system using a self-referential, indexed data storage protocol and procedure supports record storage in a table after indexing, which also allows for faster searching of data stored therein compared to other data storage systems. Moreover, the enhanced performance data storage sub-system using a self-referential, indexed data storage protocol and procedure in the present invention allows for more effective storage of data than other data storage systems, such as image and unstructured data storage. And, the enhanced performance data storage sub-system using a self-referential, indexed data storage protocol and procedure in the present invention provides for more flexibility in the configuration of the data and records stored therein over other data storage systems.

The home agent is also coupled via connection 255 to various locations L1 256, L2 257, and L3 258 at home network 150 so that operations software, data, evaluations, notifications or other information can be entered, transmitted or received on the system and controlled by users at the business location. Users at the home network location may also access the home network 150 remotely via communication links and wireless communication links or mobile units.

The mobile unit 105 represents a mobile unit used by the user to prepare and enter the feed-back evaluation information. Communications to the system, evaluations, requests for information, or notifications can be received by the user from remote access locations or the home network using the hand-held mobile unit 105 as connected to the home network 150.

The computer server SrV1 250 on the home network 150 also supports the maintenance and use of data, user profile information, software modules and operational code for the present invention, as well as maintaining the webpages that support the applications program download for the present invention, and supporting the interaction of communications with the mobile unit 105 and database 241. The Internet 175 can also maintain server computers, cloud storage, or server for maintaining database information, code, software modules, or the webpages that support the applications program download for the present invention, as well as supporting the interaction of communications with the mobile unit 105 or database 241. Furthermore, home network 150 or the computer server SRV2 185 can facilitate or assist with the maintenance of database information, code, software modules, or the webpages that support the applications program download for the present invention, as well as supporting the interaction of communications with the mobile unit 105 or database 241.

Figure 2A:
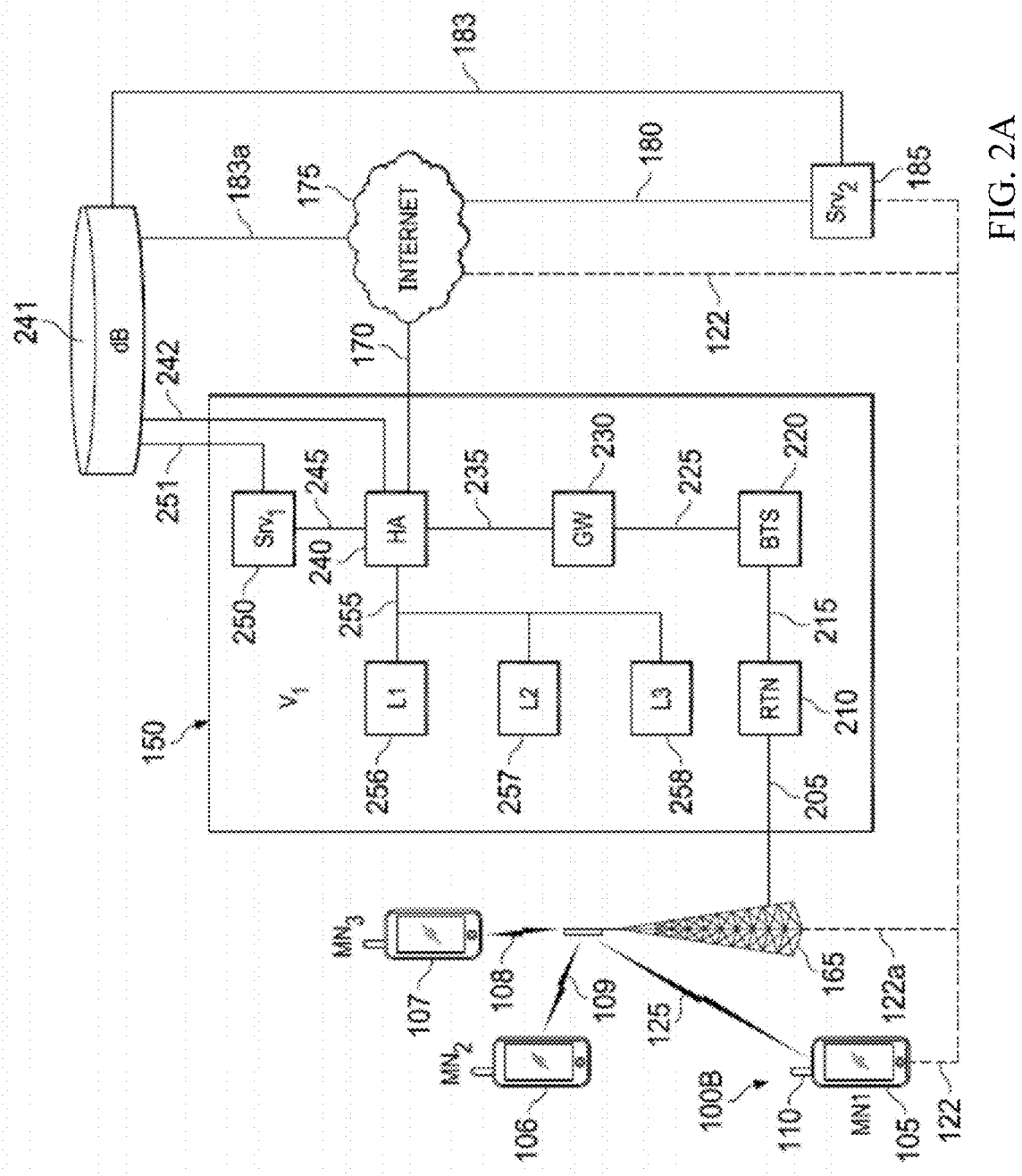

With reference of FIG. 2A, the communication system 100B of the present invention is shown with a detailed explanation of the system components available at the home network 150 as coupled via communication line 205 to the mobile radio transceiver/cellular/WIFI systems 165 as coupled to mobile nodes 105, 106 and 107. The mobile nodes 105, 106, and 107 includes a hand-held mobile unit 105, 106 and 107 that includes a processor, memory and a power source, as well as a transceiver and antenna. While a mobile unit is contemplated, lap top, fixed location computers, or computer pads can also be used instead and freely substituted with the mobile unit 105, 106 and 107. All the other system components shown in FIG. 2A are similar to, and possess the same functionality, as the system components shown in FIG. 1A, which is incorporated herein by reference.

More notably, multiple mobile nodes 106 and 107 are shown connected to the home network 150 via connections 109 and 108, respectively, to the mobile radio transceiver system 165. These additional mobile nodes support the use of the wireless communication system to users associated with the company or associated with other companies owned by common management. The mobile units 105, 106 and 107 are mobile units used by user to prepare and enter the feed-back evaluation information, but also could be mobile units used to support communications to the system, evaluation, requests for information, or notifications as received by multiple users, or multiple team members, group members, users or employees associated with the company or associated with other companies owned by common management.

The file data storage database 241 in FIG. 2A stores data in a standardized format for user profile information, and that format in the present invention enhances the performance and increases the efficiency of the present invention over known data processor and storage methods and systems through the storage of standardized formatted profile record and feedback information from input profile record and feedback information, files and profile record and feedback information in the hardware processor-based system and method and the use of an indexing and referential storage and specialized subprograms that uses hardware processor-based storage devices to collect and consolidate profile record and feedback information provided by different sources and different formats.

The database 241 in the present system and method enhances the performance and increases the efficiency of the present data processor and storage system network over known data processor and storage methods and systems by the use of an indexing and referential storage. The database 241 is used with the specialized subprograms to generate/transmit notifications, as well as generate/transmit and receive feedback notifications and messages. The present invention stores data in the database 241 in a more efficient and effective manner than previously used in other data storage systems through the use of an enhanced performance data storage sub-system using a self-referential, indexed data storage protocol and procedure that store all entity types in a single table after indexing is performed to prevent the creation of duplicative data entries in the data storage sub-system. The indexing protocols and procedures used in the enhanced data storage sub-system of the present invention reviews input data (received in health level 7 or HL7 format), The present invention's use of an enhanced performance data storage sub-system using a self-referential, indexed data storage protocol and procedure supports record storage in a table after indexing, which also allows for faster searching of data stored therein compared to other data storage systems. Moreover, the enhanced performance data storage sub-system using a self-referential, indexed data storage protocol and procedure in the present invention allows for more effective storage of data than other data storage systems, such as image and unstructured data storage. And, the enhanced performance data storage sub-system using a self-referential, indexed data storage protocol and procedure in the present invention provides for more flexibility in the configuration of the data and records stored therein over other data storage systems.

Figure 3A:
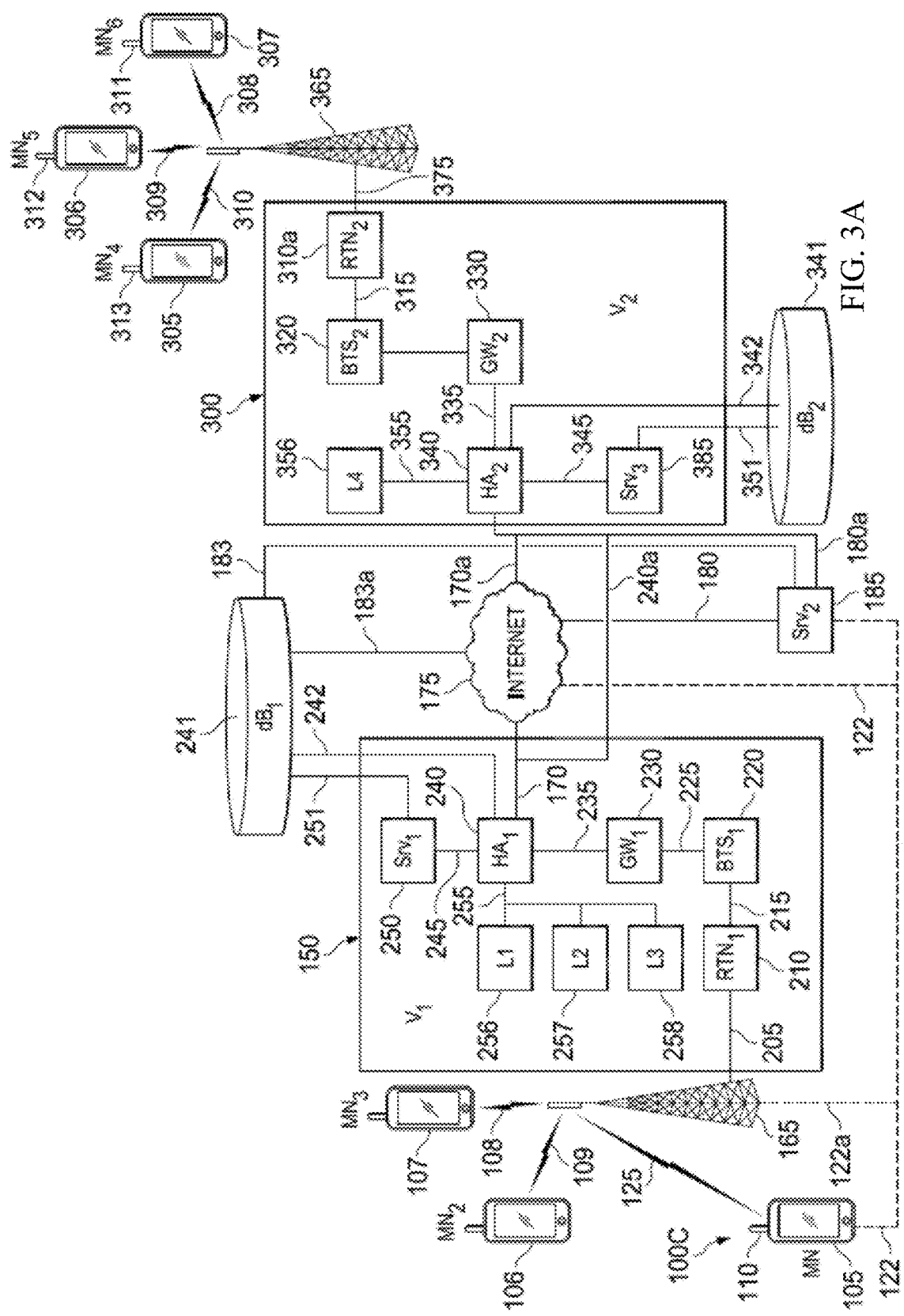

With reference of FIG. 3A, the communication system 100C of the present invention is shown with a detailed explanation of the system components available at the home network 150 as coupled to a second foreign network 300. Apart from the system components in foreign network 300 and its connections to the home network 150, all the other system components shown in FIG. 3A are similar to, and possess the same functionality, as the system components shown in FIG. 1A, which is incorporated herein by reference. FIG. 3A has a second home agent HA2 340 (or through a similar device or component connection) on the foreign network 300 coupled to the home network 150 via communication links, which can be wired or wireless connections, 170a through the Internet 175, communication link 240a to the home agent 240, or communication link 180a to the second computer server SRV2.

With respect to FIG. 3A, foreign network 300 is coupled via communication line 375 to the mobile radio transceiver/cellular/WIFI systems 365 as coupled to mobile node 305, 306 and 307. The mobile nodes 305, 306 and 307 includes a hand-held mobile unit a processor, memory and a power source, as well as a transceiver and antenna 313, 312 and 311, respectively. While a mobile unit is contemplated, lap top, fixed location computers, or computer pads can also be used instead and freely substituted with the mobile unit 305, 306 and 307. The transceiver on each mobile node 305, 306 and 307 supports radio transmission communications link 310, 309 and 308 to an radio transceiver antenna and transmission network 365 (e.g. Wi-Fi, cellular, GSM, Evdo, 4G/LTE, CDMA, or others), which is coupled via connection 375 to a radio transmission network communication gateway 310a associated with the foreign network 300.

The mobile hand-held units 305, 306 and 307 may also be connected to an outside server computer SRV2 185 via a separate connection including a wireless radio connection or a wireline communication system connection. The mobile hand-held units 305, 306 and 307 may also be connected to the Internet 175 through an outside server computer or via a separate direct connection, which can include a wireless radio connection or a wireline communication system connection. The mobile hand-held units 305, 306 and 307 can also be coupled to the radio transceiver antenna 365 and a radio transmission network that is coupled to a telecommunications system that supports connectivity to the Internet 175 or another system network without interfacing directly with equipment or components in the foreign network 300.

The radio transmission network 310s is coupled to a base station transceiver unit 320 via connection 315, where the base station transceiver station provides an interface between radio domain communications and data communications carried over a telecommunications or network computer system. The base station transceiver unit 320 is coupled to a gateway 330 for the network at the foreign network 300 via connection 325, which provides an interface with the network maintained at the foreign network 300 or another associated network. The BTS 320 may also be located remotely from the foreign network near the remote radio transmission network 365 accessed by the mobile units 305, 306 or 307.

The gateway 330 is coupled to a home agent 340 via connection 335, where the foreign agent 340 controls communication flow and directions on the network maintained at the foreign network 300 or in a network associated with the foreign network 300. The foreign agent 340 is coupled to a computer server SRV3 350 via connection 345, which maintains past historical and present real-time information, software module, operations software, or other data that may be used or communicated using the invention. The invention contemplates centrally located servers to maintain the software modules and database information at the foreign network 300 that maintain or provide access to information related to the foreign network 300, but remotely located servers and computer networks can also be accessed and used with the invention.

A database 341 is coupled to the home agent 340 via communication link 342 or computer server 350 via link 342 or computer server SrV3 385 directly via link 351. The database 341 may maintain information related to the users, but it could also maintain remote access to software modules and database information used with the software operated by the present invention as well as database information related the business operations. While only one database 341 is shown, this representation is understood to include one or more separate databases and storage locations of data and information.

The file data storage databases 241 and 341 in FIG. 1A stores data in a standardized format for profile record and feedback information, and that format in the present invention enhances the performance and increases the efficiency of the present invention over known data processor and storage methods and systems through the storage of standardized formatted profile record and feedback information from input profile record and feedback information, files and profile record and feedback information in the hardware processor-based system and method and the use of an indexing and referential storage and specialized subprograms that uses hardware processor-based storage devices to collect and consolidate profile record and feedback information provided by different sources and different formats.

The databases 241 and 341 in the present system and method enhances the performance and increases the efficiency of the present data processor and storage system network over known data processor and storage methods and systems by the use of an indexing and referential storage. The databases 241 and 341 is used with the specialized subprograms to generate/transmit notifications, as well as generate/transmit and receive feedback notifications and messages. The present invention stores data in the databases 241 and 341 in a more efficient and effective manner than previously used in other data storage systems through the use of an enhanced performance data storage sub-system using a self-referential, indexed data storage protocol and procedure that store all entity types in a single table after indexing is performed to prevent the creation of duplicative data entries in the data storage sub-system. The indexing protocols and procedures used in the enhanced data storage sub-system of the present invention reviews input data (received in health level 7 or HL7 format), The present invention's use of an enhanced performance data storage sub-system using a self-referential, indexed data storage protocol and procedure supports record storage in a table after indexing, which also allows for faster searching of data stored therein compared to other data storage systems. Moreover, the enhanced performance data storage sub-system using a self-referential, indexed data storage protocol and procedure in the present invention allows for more effective storage of data than other data storage systems, such as image and unstructured data storage. And, the enhanced performance data storage sub-system using a self-referential, indexed data storage protocol and procedure in the present invention provides for more flexibility in the configuration of the data and records stored therein over other data storage systems.

The foreign agent 340 is also coupled via connection 355 to various location L1 356 at foreign network 300 so that operations software, data, evaluations, notifications or other information can be entered, transmitted or received on the system and controlled by users at the business location. Users at the home network location may also access the foreign network 300 remotely via communication links and wireless communication links or mobile units.

The foreign network 300 represents outside networks of associated companies, teams, groups or users that interface with the home network 150, and mobile units 305, 306 and 307 represent mobile units used by the user to prepare and enter the feed-back evaluation information. Communications to the system, evaluation, requests for information, or notifications can be received by the user from remote access locations or the home network using the hand-held mobile units 305, 306 and 307 as connected to the foreign network 300.

The present invention is a specialized hardware processor-based system and method, which includes specialized data processor and storage readable medium and subprograms that is not available in a generic computer device, even though a user/provider can access the system through a standard web browser on a computing device or connection to the Internet on a single or multi-tier network. The method provides a graphical user interface (GUI) by a content server, which is hardware or a combination of both hardware and software. A user can be given remote access through the GUI to view, search, sort or input profile records and feedback information using the user's own local device (e.g., a personal data processor and storage or wireless handheld device) or another interface device.

The present invention is a system and method having a first hardware data processor coupled to a plurality of non-transitory storage devices and one or more input/output ports coupled to one or more input/output devices on a home hardware data processor subsystem, wherein the first hardware data processor is capable of execution of one or more subprograms, and the first hardware data processor makes a real-time, immediate determination about a data traffic determination based on the first hardware data processor analysis from profile records and feedback information stored in one or more of the plurality of non-transitory storage devices. The analysis is conducted according to a relationship rules subprogram having one or more relationship rules and a pre-filter subprogram, and the analysis uses the relationship rules subprogram and the pre-filter subprogram to determine level of traffic data flow and whether data traffic exceeds a threshold level as associated with particular profile records and feedback information. In the system and method of the invention, the first hardware data processor receives and transmits electronic communications from one or more input/output ports.

The system of the invention also has a transceiver subsystem coupled to the first hardware data processor through one or more input/output ports to provide a communications interface for communications between the first hardware data processor and one or more users. One or more input/output port provides access to the first hardware data processor and one or more of the plurality of non-transitory storage devices coupled to the first hardware data processor.

The present invention is a specialized hardware processor-based system and method shown in FIGS. 1A to 3A, which includes specialized data processor and storage readable medium and subprograms that are not available in a generic computer device, even though a user/provider access to the system through a standard web browser on a computing device or client connected to the Internet or single or multi-tier network. The present invention has indexing and referential storage that collects, converts and consolidates information from various users into a standardized format, including converting input of profile record and feedback data provided by different sources and different formats into that standardized format.

Figure 5:
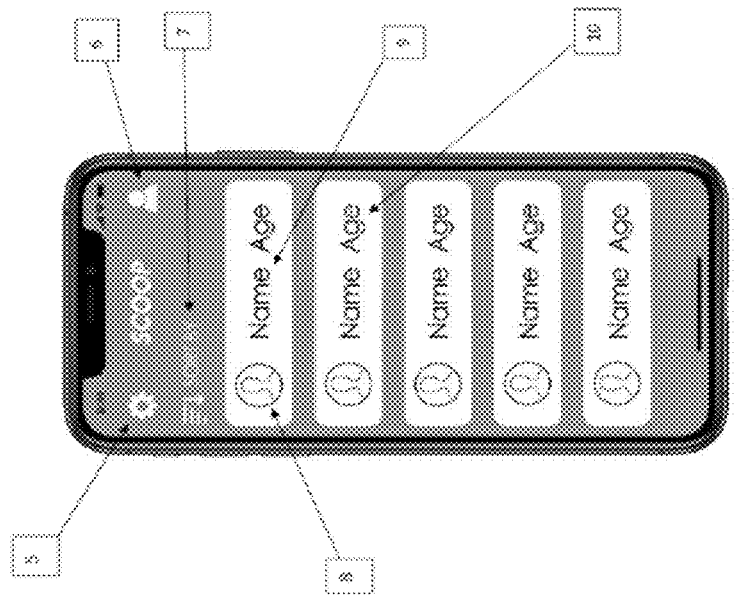
FIGS. 4, 5 and 6 show a graphical user interface on a mobile unit; and, FIGS. 7, 8a-8b, and 9-10 are flowchart of the software modules interactions employed by a system of the invention.
Figure 4:
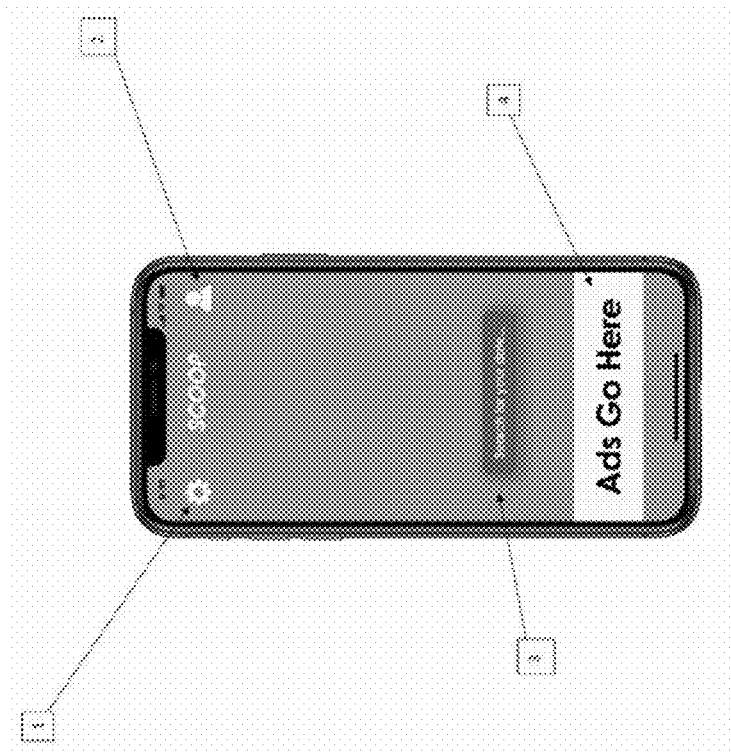
Figure 6:
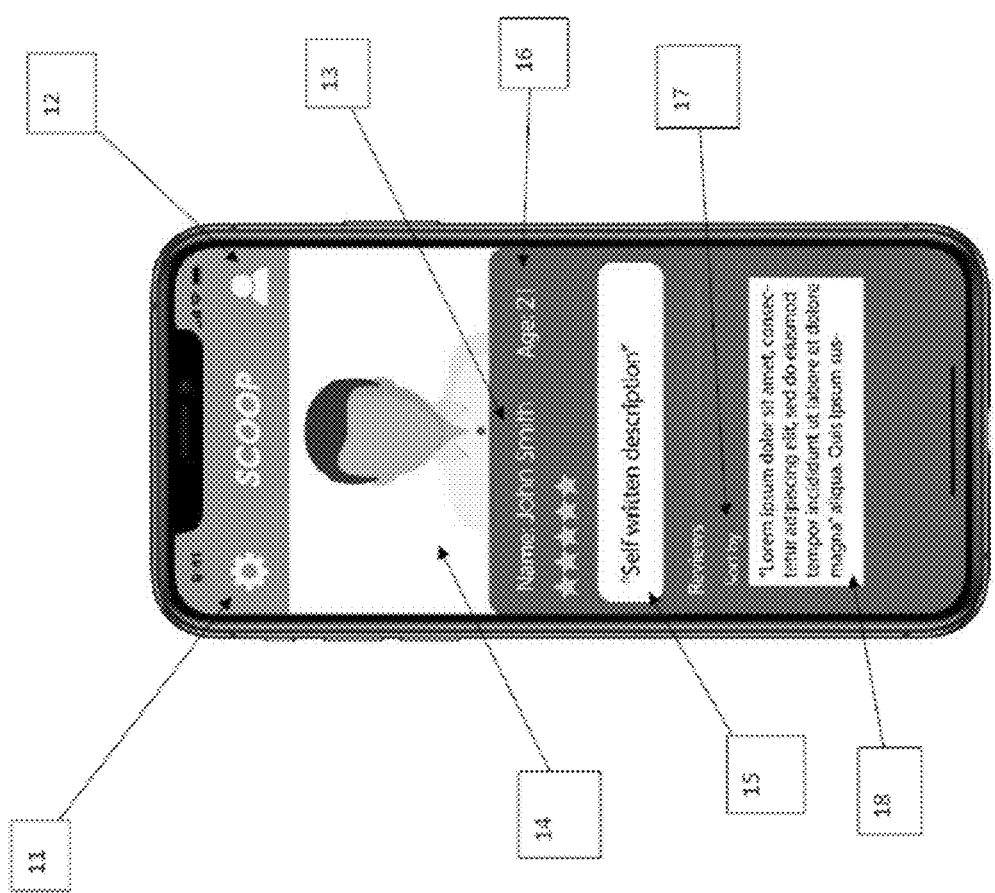

The method and system in the present invention provides a graphical user interface (GUI) by a content server, which is hardware or a combination of both hardware and software, as shown in FIGS. 4 to 6. In FIG. 4, the graphical user interface (GUI) is shown with the features icon 1, the alarm/notification icon 2, a message test 3 and an advertising space 4. In FIG. 5, the graphical user interface for the applications is shown with the features icon 5, the alarm/notification icon 6, a picture 8 and name 9 for a first profile records, and an age 10 for a second profile record to appear on the screen. In FIG. 6, a profile record for a user is shown with the features icon 11, the alarm/notification icon 12, and a larger photo 14 for the profile record. The name of the user 13 is shown for the person associated with the profile record, as well as the age 16, reviews displayed 18 and the sorting feature 17 to display the reviews in a predetermined manner. The default display of the profiles on FIG. 5 or the reviews and feedback information shown on FIG. 6 is determined by the system processor using the immediate real-time determinations and rankings using data traffic flow measurements made by the processor. In this manner, the processor is accomplishing tasks that could not be done by hand or humans without the interaction of the computer system in the present invention.

The claimed invention is directed to enhancing the performance and efficiency of a data processor and storage system and network through the conversion and storage of standardized formatted profile records and feedback information, and the use of an indexing and referential storage and specialized subprograms that uses hardware processor-based storage devices to collect, consolidate and rank profile records and feedback information.

Features provided in the present invention include up-scooping (agreement), down-scooping (disagreement), saving profile and posts, sharing profiles and post, linking profiles to postings, flagging and challenging, 18+ adult content filtering, censoring, and detection, post safeguard, five scoops personal rating system, post sorting (most recent post, most/least upscoops/downscoops, alphabetically, trustworthiness score). And, user profile features include references, profile picture, user-supplied picture(s) from social media account(s), links to personal social media, age, name, place of work, current education (if applicable), current residing city, users searched has no profile, quick view photos, Cultivation and elimination of accounts, Cone profiles, Five scoop score, In-app credit, @'s or number code, and, trustworthiness scores. Moderators are supported by the system and method, including the payment to moderators, work hours, the hierarchy of moderators, checks and balances, recruitment and removal. And, revenue can be generated by the system and method by advertising, premium, credited, and free accounts, moderator review fees.

The present invention utilizes matchmaking and reviewing software to enhance a person's experience when meeting someone from off the internet, improves users' online encounters by informing them that their online counterpart is genuine, and provides information on gathered someone by other users allowing people to get a better idea of whom they are to meet. This invention is useful in today's world, where online dating and anonymous meets are the main avenues of connecting with other people. It removes the uneasiness associated with meeting someone for the first time. The invention provides evidence and testimonials so users can be sure somebody is who they say they are, and this invention provides a way for people to quickly investigate another person based on their reviews, references, and connected social media. This invention also eliminates months of getting to know someone and turns it into a simple process in which the user can find droves of practical and relevant information within seconds.

With the creation of social media, recruitment websites, and dating apps, people can put their best foot forward and show the world what they want others to think about them. Scoop is a priceless asset to the user base of these websites and apps because it enables them to see what others think and learned about the person they connected with online. For companies like eHarmony, Match.com, and Linkedin, as well as applications like Tinder and Bumble, Scoop acts as a fact-checker and fends off catfishing and other false accounts users come into contact with online. Scoops interface is a combination of Yelp, Rate My Professor, Google Maps review interface, WhitePages, and Reddit.

The present invention incentivizes people to act congenial during encounters and dating scenarios because the invention makes accountability easily accessible. The users get direct access to what other people are saying about the person you are meeting. This invention can be used by anyone who meets with new people in person and would like additional insight and feedback about that person. Everybody involved in the online world, from dating service users to people trying to narrow down lists of potential job candidates can use the present invention. By using the present invention, users can avoid spending hours sifting through information or enduring a bad experience to learn about a crucial piece of information on someone. In that manner, the present invention saves time and prevents users from endangering themselves in risky situations with unfamiliar people.

When a user logs onto the present invention for the first time, they are required to create an account before continuing. To make an account, they must include at a minimum one picture from a social media for their profile pic, 3-5 Reference Accounts, and connect any social media accounts they have. Based on how much the new user includes when creating a new profile, their trustworthiness score can increase. Formulating the trustworthiness score is an accumulation of data provided by the user to identify/differentiate themselves from others on Scoop and incentivizes adding data. The higher the score, the more verified the account. Alterations after the conception of the account are allowed, but if details the user removes data (References, Social media, etc.), then their trustworthiness score can be negatively affected. The trustworthiness score minimizes the creation of and use of fake accounts since much data is required to beef up accounts for a good score.

Additionally, if the user lacks data on themselves or finds an account someone made pretending as them, the real owner of the account can submit government-issued identification of themselves for review. A photo verification tool performs the verification of government-issued identification, and if the further difficulty is encountered, then a moderator can investigate the validity of the identification.

If the identification is denied, then an alternative form of identification will be requested. The identification provided is saved and attached to the profile, and data can be taken from the ID and added to the profile. Throughout the process of making a new account, a user must search for their name to find any cone profiles. A cone profile is a claimable account made by someone else if the user under review does not have a profile created. If a Cone Profile is not found, then they will be asked to create a new profile. After filling in the brief information about themselves, they connect whatever Social Media accounts they have to their profile. Users take photos from the Social Media accounts they connected to add quick view photos, photos which help to identify a person in-app on their profile. If no social media accounts are attached, then the user must attach the photo of their government-issued identification, being it is the only legitimate form of ID provided.

The Trustworthiness score is a useful determinant to ensure that an account isn't fake and useful in determining whether a user's review is reliable when compared to other reviews. When a user posts a review of another, the present invention provides a link to their account. Also, the trustworthiness score of the user who made the post appears next to their name on the posting they made, allowing for quick assessment by readers. Computed by using the combination of the lifespan of account, amount of references connected, amount of up-scoops and down-scoop on posts, and amount of times reviews they created were removed from flagging or challenges.

References are connections to another user's account. Users can have as many references as they want, but the other user must accept their friend request. References are close friends that can give other users an idea of whom someone knows in the real world and helps differentiate two people with similar names. Users can utilize this to validate themselves and others. If needed, moderators can also use the references to judge if a post is worth overturning by getting a testimonial from a connected user.

Figure 8A:
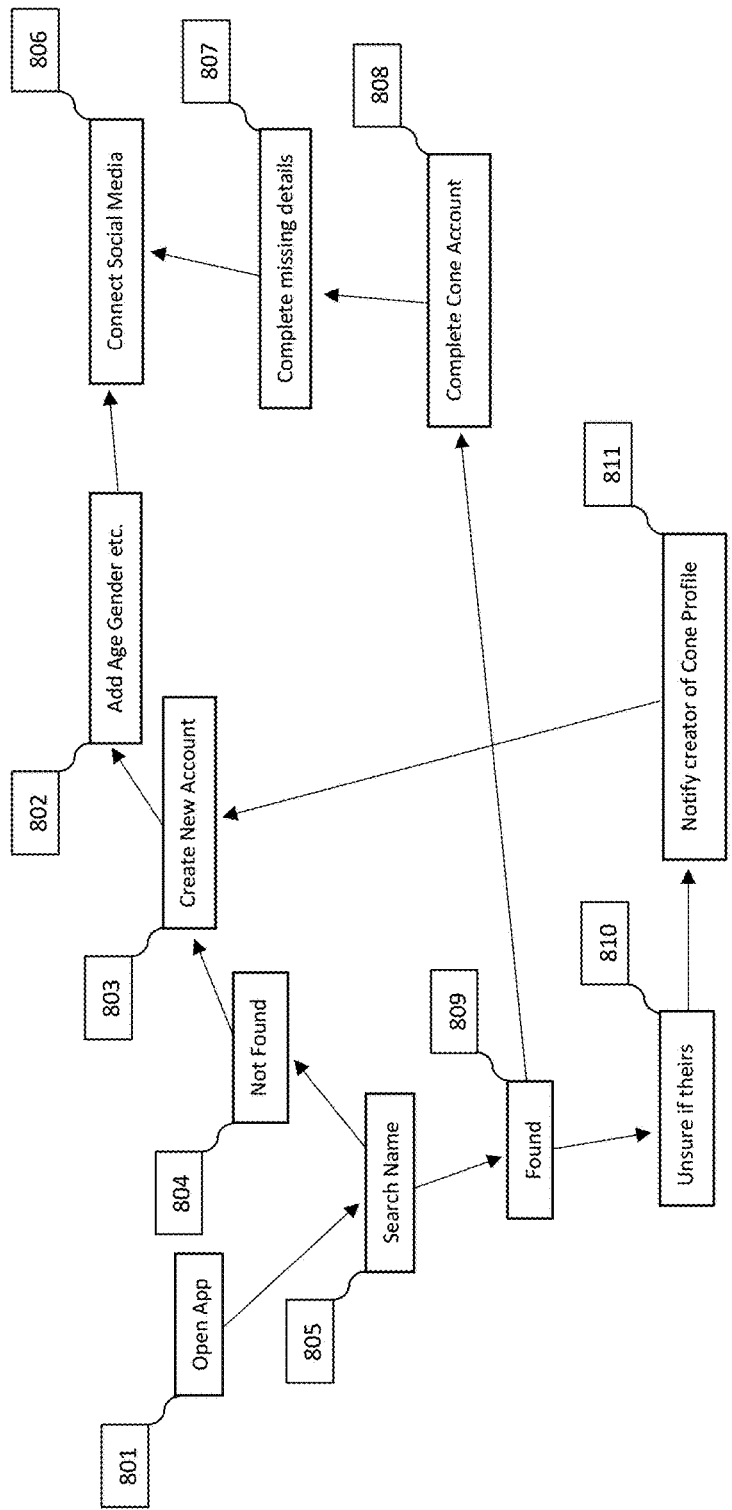
Figure 8B:
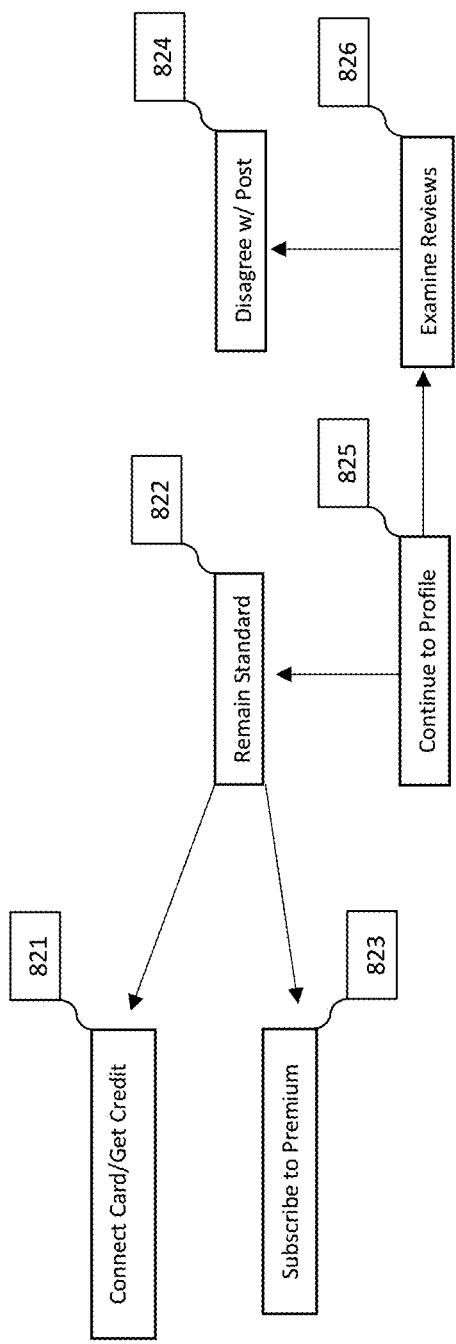
Figure 10:
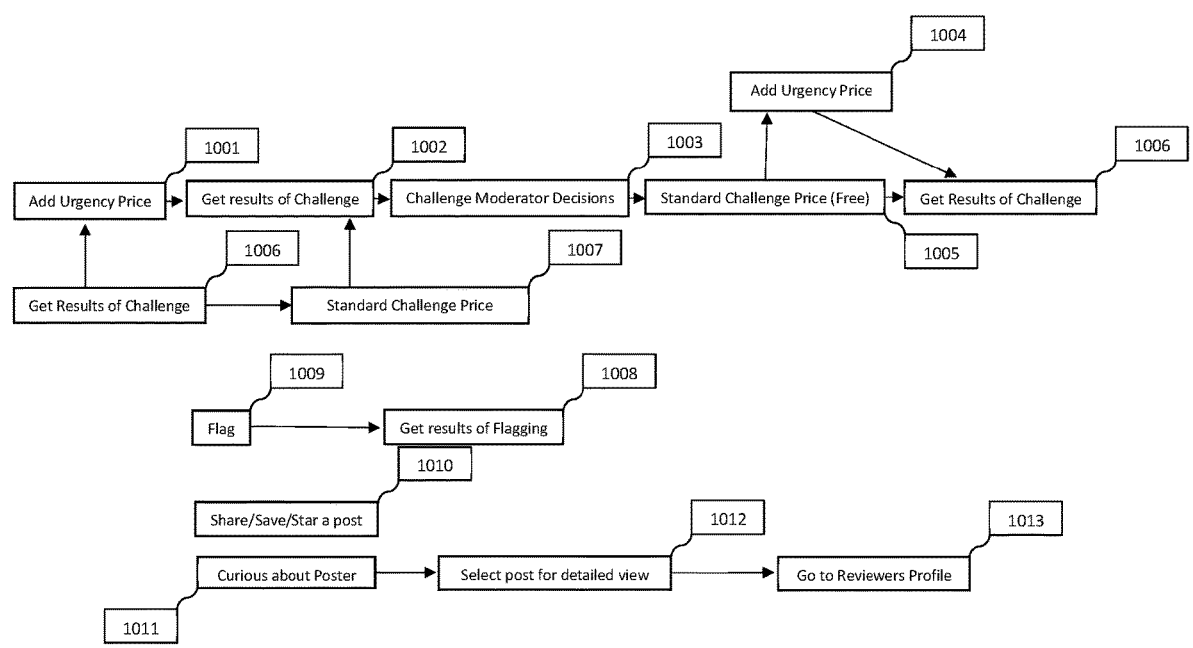

If someone is unhappy with a feedback post made about them and wants to flag or challenge a bad, slanderous, or inaccurate review, they can request a moderator look the posting over to remove it. Moderators have access to an in-app inbox, which lists currently pending flagged and challenged posts. When flagged, the attention of three active moderators is required. The overturning of a post depends on the decisions of the first three moderators to see it. The steps involved with this series of steps is shown in steps 824 and 825 in FIG. 8*b* and steps 1001 to 1013 in FIG. 10.

The three moderators act separately and have no connection to each other. Rulings are made on a majority rules basis. Challenged posts only require one moderator but take more investigating than flagged posts. Moderators who deal with challenges must complete several flagged posts before being allowed to deal with challenges to prove themselves dedicated.

Challenges are different from flaggings since users can pay to have them resolved quickly. The fee structure finds its basis on multiple factors. Users can buy in-app credit to pay for expedited review or buy a monthly subscription with prepaid expedited review in addition to other benefits that come with a premium account. If a user has a free account and does not want to pay for an expedited challenge review, they are placed in a queue with other free challenge requests to wait for a moderator to get to them.

The present invention incentivizes people to be on their best behavior when engaging with others by having real-life user interactions recorded and made available for the world to see. The present invention holds people accountable for their everyday interactions. Users must think twice before they do something rude on a date or in a lecture hall. The incentive of a positive review prompts people to act better. Similar to yelp, where restaurant reviews are recorded online and influence consumers' decisions, anybody can record a review of another person.

Up-Scooping vs. Down-Scooping: If a user agrees or disagrees with a review they see on someone else's profile feed, then they can give their opinion by giving an Up-scoop or Down-scoop. When using this function, they are adding their opinion on the post that someone else made. In the case that someone posts something similar, they can do this instead of making their post. Users can see their Up or Down-scoops recorded on their profile only visible. Up and down-scooping a post does not affect a user's trustworthiness score. Up and down-scoops self-regulate the community by relying on other users to let a specific review shine through the rest or call out a post for being untrue. Up-scoops and Down-scoops aren't disputable. Up-scoops or Down-scoops are attached to the post for quick assessment by the user.

Saving and Sharing Profiles and Post: Users can easily share or save a profile or post with someone else. They can select the share or save function, which provides choices based on what they want to do. If they want to share the post or profile, they can click the share button. If they want to save it, the user clicks the Save button. Saved profiles and posts are recorded similarly to up-scoops and down-scoops. They get sent to a folder on the user's profile, which they can view at any time.

To share your profile and profiles you find with others, the user: (1) goes to top of profile in question, (2) clicks the share button or save button, (3) sees "Share?", and (4) selects, continue to the pop-up window with sharing options, or (5) sees, "Save?" and (6) selects, profile or post sent to the saved folder in the user's profile.

Linking: Every posting made denotes the author of the post. Allowing people to trace who wrote the review.

Flagged vs. Challenged: Flagged means the user thinks a post is either inappropriate or unnecessary. Flagging is used in case a post included information that was too personal or unnecessary, for something to be called unnecessary the posting user could remove the questionable details, and it would not take away from the message of the review. Additionally, any information about the user that is private is flaggable. Information such as home or work addresses, debit or credit card numbers, phone numbers, or emails. Anything that could allow someone to take advantage of their private life. Flagging a post does not have to do with the message being conveyed, but the details involved. When a post gets flagged, it is muted from the user's account until the issue is resolved, so if it does contain sensitive information, it will not remain public.

Challenging is the action a user can take if a post made about them was slanderous or has no bearing in real life. The posting, regardless of the bias, was made in bad taste and is untrue. Challenging a post isn't about the details included, but if the post is false and just meant to insult instead of offering an appropriate review of the user. A post a user challenges does not get blocked from the publics' view, but a mark does appear to show that a moderator is reviewing it.

Payment for review services depends on the volume of people waiting for a review at the time. Users can pay as much as they want or whatever they have left on their in-app funds to too skip ahead in the queue.

To flag and challenge a review on your account, the user would: (1) go to your profile, (2) look through reviews, (3) see "any false or overly negative post?", and respond (4) yes or no, "you are good," if yes, then flag or challenge for moderator attention. The steps involved with this series of steps is shown in steps 824 and 825 in FIG. 8*b* and steps 1001 to 1013 in FIG. 10.

For a Premium account, the user would have the option of selecting an expedited service. If the user has run out of expedited services, the user can pay for credit of upgrade account. For a credit-based account, the user can select what expedited service you want based on credit on account. If need more credit, the user can purchase more credit. For a Standard account, the user can get credit or join the queue and wait for an estimated amount of time based on the volume of challenges or flags. The steps involved with this series of steps is shown in steps 821 and 826 in FIG. 8*b*.

Mature (18+ yr.) Censoring: To restrict or safeguard people from saying things that could be out of spite, a sensor that detects mature language is used to double-check a user's post. The sensor makes sure users understand that what they say has consequences. For those under 18, they are not allowed to say anything with mature language and won't be able to view posts with marked are 18+. Those older than 18 can toggle the 18+ visibility option.

5 Scoop System: Included with every posting, the user responsible for the post must include, on a scale of 1-5 Scoops, how much they enjoyed their experience with their counterpart.

Sort by System: Users can pick various sorting options to discover a specific series of reviews quickly. The options for sorting are Most Recent, Top Scoops (Upscoops and Down-scoops), Alphabetical by the user, Reciprocal Reference, and Trustworthiness Score.

References: References are connections with other user accounts that users can use to validate themselves in the app. It allows people to further research users to see if they know anyone familiar. They can also be utilized by a moderator in case they have to investigate a challenge. Using user references could be what decides if a challenge is valid.

There is no limit on the number of references that a person is allowed to have. Users can deem specific references as close friends if they are good friends or family. The only references that matter when a moderator or other user is viewing an account are those that have reciprocal references. A reciprocal reference is when two users are each other's references. Until both users accept each other's reference requests, then the reference is not valid. Reciprocal references solidify the two users know each other.

The aspect of the reviews revolves around posting one's first impression of someone else, and if friends can post biased reviews about each other, then people will take advantage of the app. Users with reciprocal references will not be able to post about each other. If a user posts a review and later becomes a reciprocal reference with the same person, then a symbol denoting their relationship on the review will appear to inform other users of possible bias.

If a user declines to add references to their account, it does not negatively affect their trustworthiness score. It would significantly advantage them to accept because having a high trustworthiness score does not hurt. It is highly recommended that new users follow the prompts and connect with their friend group on the app to get a stable baseline of references to show others they are whom they say they are.

User Supplied Photos: A new user must supply photographs of themselves for their account to help validate their profile. Making it easier for people they met in person who want to review them to find the correct profile. The user must choose a max of three 3 photos of themselves from their social media accounts to preview on Scoop. Users also connect their social media on the app for people to easily access. This will enable other users to go to their profile and see their photos on their other accounts. A user's profile picture must originate from a social media account they own as well. If the user has no social media, the photo from their government-issued identification is used in its place until a social media account is connected.

Link Social Media: Upon creation of a new profile or claiming a cone profile, a user is to connect their social media account(s) if they have accounts to connect. This is another way for other users to validate that they have found the right person on the app. As well as connecting their social media accounts after creating their account, users can also create their account by logging in with their Facebook or other social media accounts, making the verification process more manageable. After users create their accounts, they get a personalized Scoop code which they can send to others and put in the bios of their various social media accounts. The present invention makes finding the user's profile and their other social media accounts easier.

Age, Name, Place of work, Current education if applicable, Current residing city: The only information the user is allowed to input themselves when filling out their account. It is primary data that is not opinion-based and can easily differentiate two people. It keeps the present system and method separate from a dating or job app by only allowing objective information about the user. If a person does not have any social media to verify themselves, it is the only thing that the user can add to their profile, beyond providing identification and utilizing reciprocal references. If there are two or more people with the same name, the above functions help differentiate users. Social media, objective data, and reciprocal references provide other users with a means to distinguish. Users are also able to look at the profile pictures on the search screen.

Cultivation, elimination, and cone profiles (Placeholder Accounts): Users can make an account for free and upgrade their subscription anytime. Additionally, users can make a profile for others called cone profiles. Cone profiles are placeholder accounts so that reviews have somewhere to go once created. The ability to Eliminate and account won't be possible, but users do have the ability to make an account private. Instead of deleting the profile, users must first create or claim their profile and make it private in the settings. This way, users can still do reviews about others, and the posts still having somewhere to go.

Figure 9:
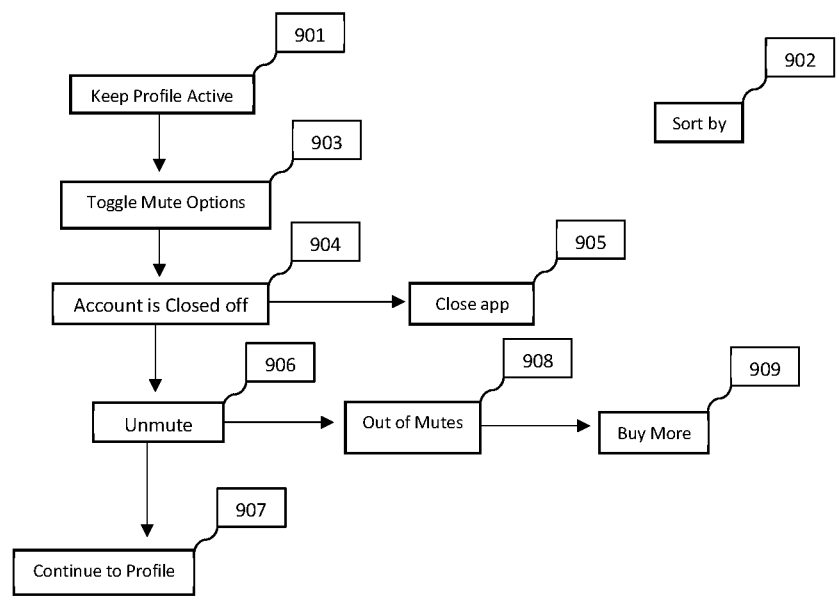

When a user goes private, they are not able to see the reviews made about them. Users who do not want an account can mute create one and then mute it, so the reviews are no longer floating around the app. Users who do make their account private can choose to go public anytime they want when they are ready. The steps involved with this series of steps is shown in steps 901 to 909 in FIG. 9.

Figure 7:
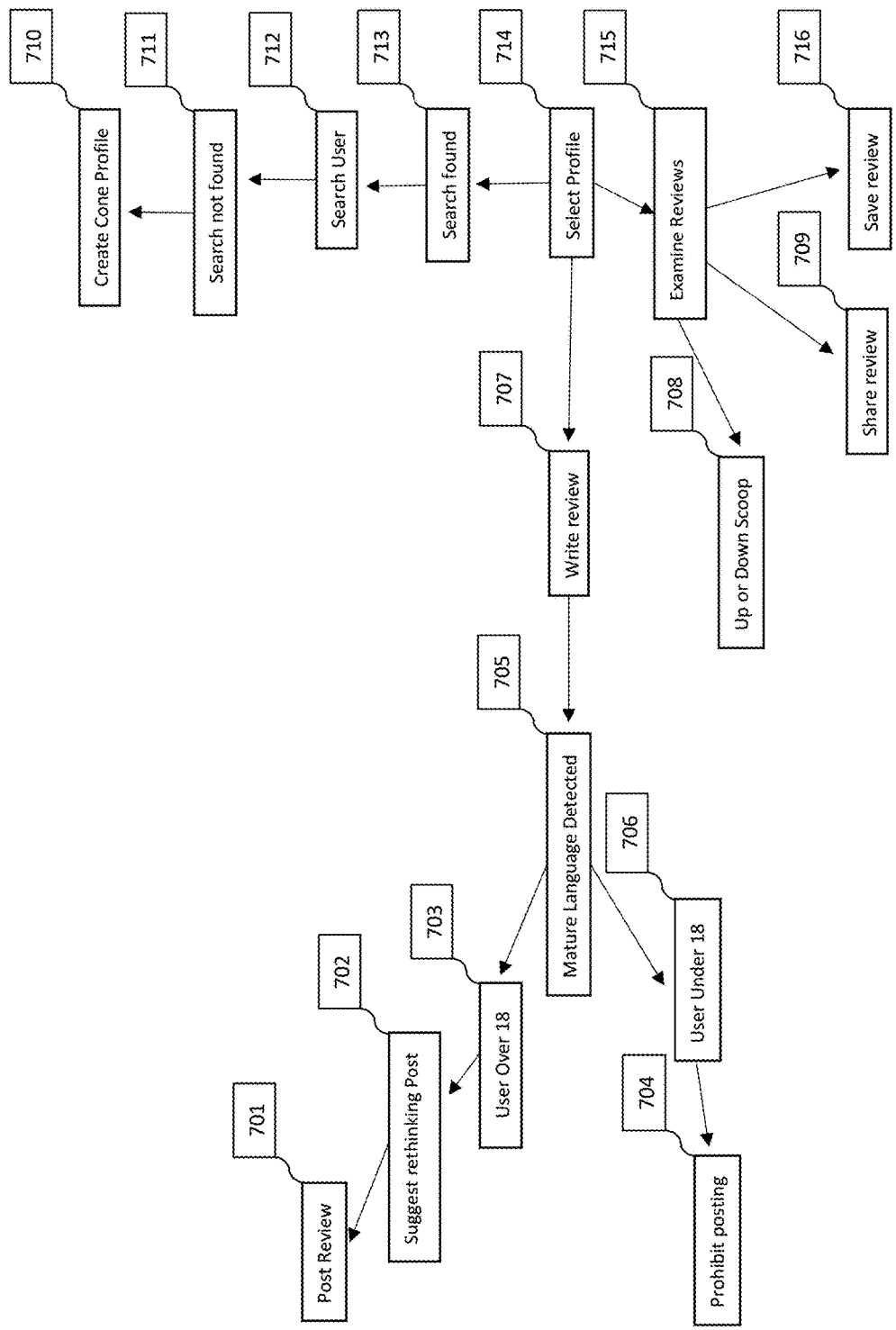

Cone Profile Records (Placeholder Accounts): Cone Profile Records are accounts without an owner. They are made in the case that a user wants to review another, but cannot because the user they want to review is not on Scoop. A cone profile holds the reviews until the owner claims it. Objective information is input by the creator of the cone profile along with their number or link to a social media account to notify them of their cone profile. The steps involved with this series of steps is shown in steps 712, 711 and 710 in FIG. 7.

When the user who can claim ownership of the account logs onto the account and finds the account, they can claim it and fill it out further, therefore, claiming the reviews. If they don't want the account to be on the app, they must first create the account to verify it is them, and then the new user can go private with the account, so if someone wants to review them, the reviews can get posted to their account and not have it be visible to other people. Whenever another user completes a review about it goes to their profile but is private, so it is saved but not visible. The private profile being complete is visible, but the reviews are not.

Private accounts—Muting: Muting is a free function usable by every user once. After the first use, they must pay to mute every time after that. Credit-based users can pay to mute every time, and premium accounts can mute and unmute as much as they want. When a user's profile is muted, they can only see their profile and not use the app. The user can cut the profile off from the public view but only see their profile until they unmute it. Muting is for people who had a cone account made for them but don't want to be on the app. Once they complete their profile on the app, they can mute it and disable other users from seeing their reviews and searching their name. The steps involved with this series of steps is shown in steps 901 to 909 in FIG. 9.

User (Scoop) Score: For every Post a User makes about someone else, the amount of up and down-Scoops received on the post gives the posting user a higher or lower score in connection to if they receive more or less up or down-scoops. The scoop score incentives users to be genuine. Higher scores improve the trustworthiness score of a user.

Credit: Credit is the online funds that allow users the ability to skip ads, pay for challenging service, and get more mutes after utilizing the first free account mute. Users can connect their card to the app store or another service for connecting their bank account to Scoop. Users can buy services as they need them or put funds on the app to have ready. Funds stored on the app are non-refundable. The steps involved with this series of steps is shown in steps 901 to 909 in FIG. 9, and steps 821 and 826 in FIG. 8*b*.

@'s or number code: Simplifies the search/share process for user accounts, so if a person has the same name as someone else on the app, then it differentiates the accounts.

A hyperlink personalized for each account automatically upon creation. The generated link will be accessible for everyone to use to share their and other people's accounts.

Payment of Moderators: Moderators receive a commission based on the number of challenges and flagged posts reviewed. The money they make is held in the app until they transfer it manually, or after two weeks from their first job completion, the money is automatically placed in their bank account. New moderators are not able to access their funds until after two weeks of work. The steps involved with this series of steps is shown in steps 824 and 825 in FIG. 8*b* and steps 1001 to 1013 in FIG. 10.

Work Hours of Moderators: Moderators will be paid based on their labor, not on their time worked. Since the work is virtual, moderators can work whenever they want where ever they want. The steps involved with this series of steps is shown in steps 824 and 825 in FIG. 8*b* and steps 1001 to 1013 in FIG. 10.

Hierarchy of Moderators: New moderators start off working only flagged reviews, which run a flat rate for every completion. After 2 weeks of reliable and consistent work, then moderators are allowed to receive challenges as well. Reliable and consistent meaning resolve at least 2 flags a day. Moderators work on their own time but need to meet a quota to remain an active moderator. Moderators who go above other Moderators in time worked and have good reception with the users get a bonus and change in title. Meaning the moderator is contacted in case of a moderator challenge. A moderator challenge is if a user disagrees with the decision of a moderator and wants a second opinion. The steps involved with this series of steps is shown in steps 824 and 825 in FIG. 8*b* and steps 1001 to 1013 in FIG. 10.

Checks and Balances (What if the user isn't satisfied with the decision): After the first challenge, the moderator challenge cost money. The user needs to purchase credits to pay for more. If they are a premium member, there is no extra fee, and it is free the rechallenge. After the second challenge, there are no more allowed, and that is the final decision.

The moderator reviews a challenged post when a user: (1) goes to the moderator section, (2) select the challenged post tab, (3) is shown users at the top of the queue, and (4) selects reviews challenged post and users in question. The moderator reviews a flagged post by: (1) going to the moderator section, (2) select the flagged post tab, (3) gets shown the most recent Flagged Post awaiting a decision, and (4) selects and reviews the post. To finalize the decision, funds added to their account. The steps involved with this series of steps is shown in steps 824 and 825 in FIG. 8*b* and steps 1001 to 1013 in FIG. 10.

Types of accounts are Standard: Free of charge, Credit-Based: In-app credit, and Premium: Monthly subscription. The credit-based is used after the credit purchased remains on the system that can only be used when the user wants to either skip an ad, gain a better position in the queue, or mute their account. They have just as many functions as a premium user but pay for everything as they use it.

Advertising: Users see advertisements based on their account type. Standard users see ads the most. Standard accounts view ads on the home screen, during scrolling, and every 10 account views. Credit-based can pay to skip ads or not see them for a select period. Premium accounts will not see any advertisements at all.

Maturity (18+ yr.) detection: A post is written by a user and ready to submit, but the query is made: (1) Does it contain Mature Language? (No), (2) Ask if the user is sure they want to post (Yes), (3) Proceed to post on Scoop profile. Then, the user chooses the number of Scoops out of 5 and describe relation to the other user. To post, the query is: (1) does it contain Mature Language? (Yes), (2) is the User under 18 years old? (Yes), and if so, (3) the system restricts user from posting until they alter the post. Is the User under 18 years old? (No), and inquiries to ask if the user is sure they want to post (Yes). Proceed to post on Scoop profile, choose the number of Scoops out of 5 and describe relation to the other user, then the review is posted. The steps involved with this series of steps is shown in steps 707 to 701 in FIG. 7.

To Create a Review of Someone Else, the user (1) searches for a profile, (2) does the profile exist? (No), (3) make a Cone Profile, (4) does the profile exist? (Yes), then (5) select the profile. Then, (7) is the profile private? (Yes) and ask if the user is sure they want to post (Yes), (8) proceed to post on Scoop profile, (9) choose the number of Scoops out of 5 and describe relation to the other user, and (10) post review. If the profile private? (No), then (11) ask if the user is sure they want to post (Yes), (12) proceed to post on Scoop profile, (13) choose the number of Scoops out of 5 and describe relation to the other user, and (14) post review. The steps involved with this series of steps is shown in steps 712 to 716, 707-709, and 707-701 in FIG. 7.

To view other profiles, the user (1) searches for profiles, (2) goes to review section of the profile, (3) chooses the sort by if you desire to change how the reviews are displayed, and (4) examines posts. Asked if "Curious about who wrote a specific review? (Yes)", user responds by (5) click their name. After reviewing the post, the user can: (6) agree with the post? (Yes), by placing Up-Scoop on the post, or (7) if disagree with the post? (Yes), can place Down-Scoop the post. The steps involved with this series of steps is shown in steps 712 to 715, and step 708 in FIG. 7.

To get App/Create Account: (1) download app, and (2) open app. The user is asked, (3) do you have account? (Yes), and if so, (4) proceed to profile and rest of app. If (5) have account? (No), then (6) asked have a Cone Account available? (Yes), and (7) claim as your own and complete account. Asked (8) Keep Public (Yes), then user (9) add descriptors (Self-identification, pictures, social media), but if user (10) Keep Public (No), then (11) go to Settings and Mute account. If when asked (12) have a Cone Account Available? (No), (13) create a new account, (14) Keep Public (Yes), (15) add descriptors (Self-identification, pictures, social media), or (16) Keep Public (No), 17) Go to Settings and Mute account. The steps involved with this series of steps is shown in steps 901 to 909 in FIG. 9, and steps 806 to 809 in FIG. 8*a*.

If the user wants to become a premium account or credit-based? (Yes), then the user (1) goes to the app store and chooses account type, and choose the payment method. Does payment go through? (No), then (2) try another Payment Method. Does payment go through? (Yes), then (3) return to Scoop with account upgraded. The steps involved with this series of steps is shown in steps 801-811 in FIG. 8*a*.

To create an account through social media, the user (1) add descriptors (Self-identification, pictures, social media), and asked, (2) do you want a premium account or credit? (Yes), (3) go to the app store, choose account type, (4) choose the payment method, (5) does payment go through? (No), (6) try another Payment Method, (7) does payment go through? (Yes), then (7) return to Scoop with account upgraded. The steps involved with this series of steps is shown in steps 801-811 in FIG. 8*a*.

To Search Others, the user is asked (1) do you have an account? (No), then user is given option to make one, or (2) do you have an account? (Yes), then user is asked "Is your profile muted?" (Yes), then (3) denied access or (4) asked "Is your profile muted?" (No), then the user is (5) given a search bar, (6) tap search bar, (7) enter the name or user tag of the user in question, (8) sort users by how you desire, to (9) locate user. If unable to locate a profile, the user (10) selects "User not located," and asked if (11) wants to create a Cone profile, (12) enter details required and number or email to notify the user, (13) submit review. The steps involved with this series of steps is shown in steps 712 to 716, 707-709, and 707-701 in FIG. 7.

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

I claim:

1. A system comprising:
  a plurality of non-transitory memory storage devices that stores and maintains data in a standardized storage format, said standardized storage format is applied to profile records and feedback information stored in memory storage devices, including records, files, profile information and photo data after conversion of said records, files, profile information and photo data from a non-standardized and inconsistent data format said standardized records, files, profile information and photo data are accessible by remote access from said memory storage devices,
    said memory storage device stores and maintains data regarding the status of records, files, profile information as flagged or challenged,
      a flagged record, file or profile, including a third party post, is designated as inappropriate, personal, private or unnecessary by the user, which results in a status flag being set on the data stored on the memory storage device, said flag being set on the data for user's account will mute the flagged record, files or profiles, including posts supplied by others, until the issue is resolved, so inappropriate, personal, private or unnecessary will be excluded from the public domain; and
      a challenged record, file or profile, including a third party post, is designated by the user as being slanderous or untrue, which results in a challenged flag being set on the data stored on the memory storage device, said challenged flag being set on the data for user's account will remain publically viewable but will designate that a moderator is reviewing it;
    said memory storage device uses a self-referential, indexed data storage protocol and procedure to store all entity types in a single table after indexing is performed to prevent the creation of duplicative data entries in the data storage sub-system, said indexing and referential storage protocols to enhance system performance and efficiency;
  a home agent computer supporting the processing of communications on the system including processing communications to be transmitted to and received from the system, and receiving and transmitting communications on the system, said home agent controls communication flow and directions on the system and outside the system and maintains past historical and present real-time information, software module, operations software, or other data that may be used or communicated to the system;
  a first hardware data processor coupled to said home agent computer and to a plurality of non-transitory memory storage programmed with executable instructions, said hardware data processor processes communications between a home agent computer and said hardware data processor being a specialized hardware processor that use specialized data processor and storage readable medium and subprograms; said hardware data processor executes one or more subprograms, and receives records, files, profile information and photo data for storage and maintenance on said plurality of non-transitory storage devices after conversion to a standardized data format,
    said hardware data processor conducts a real-time automated filtering and evaluation of feedback information transmitted to the system, including the identification of mature language content and ranking of popularity based on data traffic flows exceeding a predetermined threshold level,
    said hardware data processor transmitting a real-time notification to said selected users regarding the subject of any feedback transmission received by the system after conducted the automated evaluation and filtering of the feedback transmission, said real-time notifications being sent to selected personnel so the information can be reviewed and contested by the subject of the review;
  one or more input/output ports coupled to said first hardware data processor through said home agent computer, said input/output ports provide remote access to said profile record and feedback information stored on said memory storage devices;
  one or more input/output devices coupled to said first hardware data processor through said input/output ports and said one or more input/output devices supporting access to the system by one or more mobile units; said input/output devices provide remote access to said profile record and feedback information stored on said memory storage devices through a graphical user interface coupled to said hardware data processor, allowing profile records and feedback information can be input, accessed and modified into non-transitory memory storage devices,
  one or more input/output displays coupled to said first hardware data processor through said home agent computer; said input/output displays support a graphical user interface that allows profile records and feedback information to be input, accessed and modified into non-transitory memory storage devices, said graphical user interface displays an alarm/notification icon, a message test icon, and advertising space, a features icon, a picture space and a name space for a first profile records;
  said one or more input/output ports coupled to said one or more input/output devices, mobile units, or input/output displays providing input data related to one or more profile records and feedback information to said first hardware data processor to convert all input data relating to said profile records and feedback information received on the input/output ports into a standardized data format, storing the standardized data relating to said profile records and feedback information in one of said plurality of non-transitory memory storage devices, retrieving said standardized information relating to said profile records and feedback information upon request and allowing said standardized information relating to said profile records and feedback information to be displayed and transmitted from the home agent computer;

a monitor subsystem operating on said first hardware data processor using a specialized data processor that monitors data traffic transmissions associated with said profile records and feedback information communications to the system, collects network data and compares the data traffic transmissions against predetermined threshold levels to automatically determine which said profile records and feedback information associated with particular users are the most popular and visited in said plurality of non-transitory memory storage;

said first hardware data processor automatically rearranges and sorts the display of a user identification on a real-time, immediate basis associated with the profiles and feedback information that exceed the predetermined threshold level as determined by said monitor, with an automatic ranking of the profile records and feedback information based on higher data traffic to lower data traffic use that signifies most popular profiles to least popular profiles; and said first hardware data processor repeatedly measures the data transmission levels on the system, and sends control signals to the first hardware data processor to generate messages to users regarding the ranking of profiles and sends control signals to the display to display a rearranged ranking of the profile records and feedback information based on processing and analysis ranking.

2. The system of claim 1 further comprising:
a transceiver subsystem coupled to said first hardware data processor through said one or more input/output ports to provide a communications interface for communications between the first hardware data processor and one or more users.

3. The system of claim 1 wherein said one or more of said plurality of non-transitory storage devices is coupled to said first hardware data processor on said first hardware data processor.

4. The system of claim 1 wherein one or more of the input/output port provides access to the first hardware data processor and one or more of said plurality of non-transitory storage devices coupled to the first hardware data processor.

5. The system of claim 1 wherein one or more of the input/output port provides remote access to said profile records and feedback information through a graphical user interface.

6. The system of claim 5 wherein said graphical user interface is coupled to said hardware data processor and one or more of said plurality of non-transitory storage devices so that said profile records and feedback information can be input, accessed and modified into non-transitory memory storage remotely.

7. The system of claim 1 wherein said hardware data processor makes determinations of traffic data flow to automatically, on said real-time, immediate basis, update one or more rankings of the users associated with the profile records and feedback information.

8. A system comprising:
a plurality of non-transitory memory storage devices that stores and maintains data in a standardized storage format, said standardized storage format is applied to profile records and feedback information stored in memory storage devices, including records, files, profile information and photo data after conversion of said records, files, profile information and photo data from a non-standardized and inconsistent data format said standardized records, files, profile information and photo data are accessible by remote access from said memory storage devices, said memory storage device stores and maintains data regarding the status of records, files, profile information as flagged or challenged, a flagged record, file or profile, including a third party post, is designated as inappropriate, personal, private or unnecessary by the user, which results in a status flag being set on the data stored on the memory storage device, said flag being set on the data for user's account will mute the flagged record, files or profiles, including posts supplied by others, until the issue is resolved, so inappropriate, personal, private or unnecessary will be excluded from the public domain; and a challenged record, file or profile, including a third party post, is designated by the user as being slanderous or untrue, which results in a challenged flag being set on the data stored on the memory storage device, said challenged flag being set on the data for user's account will remain publically viewable but will designate that a moderator is reviewing it;

said memory storage device uses a self-referential, indexed data storage protocol and procedure to store all entity types in a single table after indexing is performed to prevent the creation of duplicative data entries in the data storage sub-system, said indexing and referential storage protocols to enhance system performance and efficiency;

a home agent computer supporting the processing of communications on the system including processing communications to be transmitted to and received from the system, and receiving and transmitting communications on the system, said home agent controls communication flow and directions on the system and outside the system and maintains past historical and present real-time information, software module, operations software, or other data that may be used or communicated to the system;

a first hardware data processor coupled to said home agent computer and to a plurality of non-transitory memory storage programmed with executable instructions, said hardware data processor processes communications between a home agent computer and said hardware data processor being a specialized hardware processor that use specialized data processor and storage readable medium and subprograms; said hardware data processor executes one or more subprograms, and receives records, files, profile information and photo data for storage and maintenance on said plurality of non-transitory storage devices after conversion to a standardized data format, said hardware data processor conducts a real-time automated filtering and evaluation of feedback information transmitted to the system, including the identification of mature language content and ranking of popularity based on data traffic flows exceeding a predetermined threshold level, said hardware data processor transmitting a real-time notification to said selected users regarding the subject of any feedback transmission received by the system after conducted the automated evaluation and filtering of the feedback transmission, said real-time notifications being sent to selected personnel so the information can be reviewed and contested by the subject of the review;

one or more input/output ports coupled to said first hardware data processor through said home agent computer; said input/output ports provide remote access to said profile record and feedback information stored on said memory storage devices;

one or more input/output devices coupled to said first hardware data processor through said input/output ports and said one or more input/output devices supporting access to the system by one or more mobile units; said input/output devices provide remote access to said profile record and feedback information stored on said memory storage devices through a graphical user interface coupled to said hardware data processor, allowing profile records and feedback information can be input, accessed and modified into non-transitory memory storage devices, one or more input/output displays coupled to said first hardware data processor through said home agent computer; said input/output displays support a graphical user interface that allows profile records and feedback information to be input, accessed and modified into non-transitory memory storage devices, said graphical user interface displays an alarm/notification icon, a message test icon, and advertising space, a features icon, a picture space and a name space for a first profile records;

said one or more input/output ports coupled to said one or more input/output devices, mobile units, or input/output displays providing input data related to one or more profile records and feedback information to said first hardware data processor, said profile records and feedback information being accessed by users of said mobile unit on an unrestricted basis or a restricted and limited basis;

said first hardware data processor performing an execution of one or more executable instructions to convert all input data relating to said profile records and feedback information received on the input/output ports into a standardized data format, storing the standardized data relating to said profile records and feedback information in one of said plurality of non-transitory memory storage devices, retrieving said standardized information relating to said profile records and feedback information upon request and allowing said standardized information relating to said profile records and feedback information to be displayed and transmitted from the home agent computer;

said first hardware data processor processes feedback communications received from one or more mobile units related to one or more users associated with said profile records stored in said non-transitory storage device, and, a monitor operating on said first hardware data processor that conducts real-time automated evaluation of feedback communications received by the system, said monitor providing automated real-time notifications to selected personnel so the feedback information can be reviewed by the user associated with the feedback communication.

9. The system of claim 8 wherein said monitor operating on said first hardware data processor transmits one or more real-time notifications to selected users associated with said profile record if associated feedback communications are negative.

10. The system of claim 9 wherein said system receives a communication contesting the feedback communication by a user associated with one or more profile records, which will subject the feedback communication to a review protocol.

11. The system of claim 8 wherein said monitor operating on said first hardware data processor conducts real-time automated evaluation of feedback communications for mature language content.

12. The system of claim 8 wherein said monitor operating on said first hardware data processor monitors data traffic transmissions associated with said profile records and feedback information communications to the system, collects network data and compares the data traffic transmissions against predetermined threshold levels to automatically determine which said profile records and feedback information associated with particular users are most popular and visited in said plurality of non-transitory memory storage.

13. The system of claim 8 wherein said first hardware data processor automatically rearranges and sorts the display of the user identification on a real-time, immediate basis associated with the profiles and feedback information that exceed a predetermined threshold level as determined by said monitor, with an automatic ranking of the profile records and feedback information based on higher data traffic to lower data traffic use that signifies most popular profiles to least popular profiles.

14. The system of claim 8 wherein said first hardware data processor repeatedly measures the data transmission levels on the system, and sends control signals to the first hardware data processor to generate messages to users regarding the ranking of profiles and sends control signals to the display to display rearranged ranking of the profile records and feedback information based on processing and analysis ranking.

15. The system of claim 8 wherein said first hardware data processor makes a location and proximity determination for a mobile unit that is responsible for the transmission of one or more feedback communications received from one or more mobile units related to one or more users associated with one or more profile records stored in said non-transitory storage device.

16. The system of claim 8 further comprising:
a gateway coupled to said home agent computer to control the transmission of communications to the first hardware data processor.

17. The system of claim 8 wherein said non-transitory storage unit stores specialized subprograms to generate notification messages, evaluate received communications; and process requests to add or edit one or more profile records.

18. A method of operating a communication system comprising:
providing a plurality of non-transitory memory storage devices, a home agent computer, and a first hardware data processor coupled to said home agent computer and to a plurality of non-transitory memory storage programmed with executable instructions, storing and maintaining data in a standardized storage format, said standardized storage format is applied to profile records and feedback information stored in memory storage devices, including records, files, profile information and photo data after conversion of said records, files, profile information and photo data from a non-standardized and inconsistent data format said standardized records, files, profile information and photo data are accessible by remote access from said memory storage devices, storing and maintaining data regarding the status of records, files, profile information as flagged or challenged, a flagged record, file or profile, including a third party post, is designated as inappropriate, personal, private or unnecessary by the user, which results in a status flag being set on the data stored on the memory storage device, said flag being set on the data for user's account will mute the flagged record, files or profiles, including posts supplied by others, until the issue is resolved, so inappropriate, personal, private or unnecessary will be excluded from the public domain; and a challenged record, file or profile, including a third party post, is designated by the user as being slanderous or untrue, which results in a challenged flag being set on the data stored on the memory storage device, said challenged flag being set on the data for user's account will remain publically viewable but will designate that a moderator is reviewing it;

using a self-referential, indexed data storage protocol and procedure on said memory storage device to store all entity types in a single table after indexing is performed to prevent the creation of duplicative data entries in the data storage sub-system, said indexing and referential storage protocols to enhance system performance and efficiency;

supporting on the home agent computer the processing of communications on the system including processing communications to be transmitted to and received from the system, and receiving and transmitting communications on the system, said home agent controls communication flow and directions on the system and outside the system and maintains past historical and present real-time information, software module, operations software, or other data that may be used or communicated to the system;

processing on said hardware data processor communications between a home agent computer and said hardware data processor being a specialized hardware processor that use specialized data processor and storage readable medium and subprograms; said hardware data processor executes one or more subprograms, and receives records, files, profile information and photo data for storage and maintenance on said plurality of non-transitory storage devices after conversion to a standardized data format, conducting on said hardware data processor a real-time automated filtering and evaluation of feedback information transmitted to the system, including the identification of mature language content and ranking of popularity based on data traffic flows exceeding a predetermined threshold level, transmitting on said hardware data processor a real-time notification to said selected users regarding the subject of any feedback transmission received by the system after conducted the automated evaluation and filtering of the feedback transmission, said real-time notifications being sent to selected personnel so the information can be reviewed and contested by the subject of the review;

providing one or more input/output ports coupled to said first hardware data processor through said home agent computer;

providing one or more input/output devices coupled to said first hardware data processor through said input/output ports, said one or more input/output devices supporting access to the system by one or more mobile units;

providing one or more input/output displays coupled to said first hardware data processor through said home agent computer;

providing input data related to one or more profile records and feedback information to said first hardware data processor from said one or more input/output devices, mobile units, or input/output displays through said one or more input/output ports;

executing on said first hardware data processor one or more executable instructions to convert all input data relating to said profile records and feedback information received on the input/output ports into a standardized data format, storing the standardized data relating to said profile records and feedback information in one of said plurality of non-transitory memory storage devices, retrieving said standardized information relating to said profile records and feedback information upon request and allowing said standardized information relating to said profile records and feedback information to be displayed and transmitted from the home agent computer;

monitoring by a monitor operating on said first hardware data processor data traffic transmissions associated with said profile records and feedback information communications to the system, collecting network data using said monitor;

comparing using said monitor the data traffic transmissions against predetermined threshold levels to automatically determine which said profile records and feedback information associated with particular users are most popular and visited in said plurality of non-transitory memory storage;

rearranging automatically with said first hardware data processor the display of the user identification on a real-time, immediate basis associated with the profile records and feedback information that exceed the predetermined threshold level as determined by said monitor, with an automatic ranking of the profile records and feedback information based on higher data traffic to lower data traffic use that signifies most popular profiles to least popular profiles; and measuring repeatedly by said first hardware data processor the data transmission levels on the system;

generating by the first hardware data processor messages to users regarding the ranking of profiles; and, transmitting by the first hardware data processor control signals to the display to display rearranged ranking of the profile records and feedback information based on processing and analysis ranking.

19. The method of operating a communication system in claim 18 further comprising the step of:

providing a communication interface through said one or more input/output ports for communications between the first hardware data processor and one or more users using a transceiver subsystem coupled to said first hardware data processor through said one or more input/output ports to provide communications.

20. The method of operating a communication system in claim 18 further comprising the step of:

providing access to the first hardware data processor and one or more of said plurality of non-transitory storage devices coupled to the first hardware data processor through said one or more input/output port.

21. The method of operating a communication system in claim 18 further comprising the step of:
providing remote access to said profile records and feedback information through a graphical user interface.

22. The method of operating a communication system in claim 21 further comprising the step of:
coupling said graphical user interface to said hardware data processor and one or more of said plurality of non-transitory storage devices so that said profile records and feedback information can be input, accessed and modified into non-transitory memory storage remotely.

23. The method of operating a communication system in claim 18 further comprising the step of:
making determinations by said hardware data processor about traffic data flow to automatically, on an immediate real-time basis, update one or more rankings of users associated with the profile records and feedback information.

24. A method of operating a communication system comprising:
providing a plurality of non-transitory memory storage devices, a home agent computer, and a first hardware data processor coupled to said home agent and to said plurality of non-transitory memory storage programmed with executable instructions,
storing and maintaining data in a standardized storage format, said standardized storage format is applied to profile records and feedback information stored in memory storage devices, including records, files, profile information and photo data after conversion of said records, files, profile information and photo data from a non-standardized and inconsistent data format said standardized records, files, profile information and photo data are accessible by remote access from said memory storage devices,
storing and maintaining data regarding the status of records, files, profile information as flagged or challenged,
  a flagged record, file or profile, including a third party post, is designated as inappropriate, personal, private or unnecessary by the user, which results in a status flag being set on the data stored on the memory storage device, said flag being set on the data for user's account will mute the flagged record, files or profiles, including posts supplied by others, until the issue is resolved, so inappropriate, personal, private or unnecessary will be excluded from the public domain; and
  a challenged record, file or profile, including a third party post, is designated by the user as being slanderous or untrue, which results in a challenged flag being set on the data stored on the memory storage device, said challenged flag being set on the data for user's account will remain publically viewable but will designate that a moderator is reviewing it;
using a self-referential, indexed data storage protocol and procedure on said memory storage device to store all entity types in a single table after indexing is performed to prevent the creation of duplicative data entries in the data storage sub-system, said indexing and referential storage protocols to enhance system performance and efficiency;
supporting on the home agent computer the processing of communications on the system including processing communications to be transmitted to and received from the system, and receiving and transmitting communications on the system, said home agent controls communication flow and directions on the system and outside the system and maintains past historical and present real-time information, software module, operations software, or other data that may be used or communicated to the system;
processing on said hardware data processor communications between a home agent computer and said hardware data processor being a specialized hardware processor that use specialized data processor and storage readable medium and subprograms; said hardware data processor executes one or more subprograms, and receives records, files, profile information and photo data for storage and maintenance on said plurality of non-transitory storage devices after conversion to a standardized data format,
conducting on said hardware data processor a real-time automated filtering and evaluation of feedback information transmitted to the system, including the identification of mature language content and ranking of popularity based on data traffic flows exceeding a predetermined threshold level,
transmitting on said hardware data processor a real-time notification to said selected users regarding the subject of any feedback transmission received by the system after conducted the automated evaluation and filtering of the feedback transmission, said real-time notifications being sent to selected personnel so the information can be reviewed and contested by the subject of the review;
providing one or more input/output ports coupled to said first hardware data processor through said home agent computer;
providing one or more input/output devices coupled to said first hardware data processor through said input/output ports, said one or more input/output devices supporting access to the system by one or more mobile units;
providing one or more input/output displays coupled to said first hardware data processor through said home agent computer;
providing input data related to one or more profile records and feedback information to said first hardware data processor from said one or more input/output devices, mobile units, or input/output displays through said one or more input/output ports;
executing on said first hardware data processor one or more executable instructions to convert all input data relating to said profile records and feedback information received on the input/output ports into a standardized data format,
storing the standardized data relating to said profile records and feedback information in one of said plurality of non-transitory memory storage devices,
retrieving said standardized information relating to said profile records and feedback information upon request and allowing said standardized information relating to said profile records and feedback information to be displayed and transmitted from the home agent;
processing by said first hardware data processor feedback communications received from one or more mobile units related to one or more user associated with one or more profile records stored in said non-transitory storage device; and, monitoring with a monitor operating on said first hardware data processor feedback communications received by the system, providing from said first hardware data processor automated real-time notifications to selected personnel based on the monitoring on the monitor so that said feedback communications can be reviewed by the user associated with the feedback communication.

25. The method of operating a communication system in claim 24 further comprising the step of:

transmitting based on the monitoring operated by said monitor on said first hardware data processor one or more real-time notifications to selected users associated with a profile record if associated feedback communications are negative.

26. The method of operating a communication system in claim 24 further comprising the step of:

receiving a communication contesting the feedback communication by a user associated with one or more profile records, and, conducting a review of the feedback communication if requested by the user associated with the profile record.

27. The method of operating a communication system in claim 24 further comprising the step of:

monitoring using the monitor operating on said first hardware data processor feedback communications for mature language content using a real-time automated evaluation.

28. The method of operating a communication system in claim 24 further comprising the step of:

monitoring using the monitor operating on said first hardware data processor data traffic transmissions associated with said profile records and feedback information communications to the system, collecting network data; and, comparing the data traffic transmissions against predetermined threshold levels to automatically determine which said profile records and feedback information associated with particular users are the most popular and visited in said plurality of non-transitory memory storage.

29. The method of operating a communication system in claim 24 further comprising the step of:

rearranging automatically by the first hardware data processor the display of user identification on a real-time, immediate basis associated with the profiles and feedback information that exceed a predetermined threshold level as determined by said monitor, with an automatic ranking of the profile records and feedback information based on higher data traffic to lower data traffic use that signifies most popular profiles to least popular profiles.

30. The method of operating a communication system in claim 24 further comprising the step of:

measuring repeatedly using said first hardware data processor the data transmission levels on the system;

transmitting control signals to the first hardware data processor to generate messages to users regarding the ranking of profiles; and, transmitting control signals to the display to display the rearranged ranking of the profile records and feedback information based on the processing and analysis ranking.

31. The method of operating a communication system in claim 24 further comprising the step of:

making a determination using said first hardware data processor about a location and proximity of a mobile unit responsible for the transmission of one or more feedback communications received from one or more mobile units related to one or more users associated with said profile records stored in said non-transitory storage device.

\* \* \* \* \*

UNITED STATES PATENT AND TRADEMARK OFFICE
CERTIFICATE OF CORRECTION

| | |
|---|---|
| PATENT NO. | : 11,397,745 B1 |
| APPLICATION NO. | : 16/831798 |
| DATED | : July 26, 2022 |
| INVENTOR(S) | : Grant Carter Hemingway |

It is certified that error appears in the above-identified patent and that said Letters Patent is hereby corrected as shown below:

In the Claims

Claim 1, Line 24, after "unnecessary" insert --records, files, or profiles--
Claim 1, Line 30, replace "publically" with --publicly--
Claim 1, Line 73, after "conducted" insert --by--
Claim 1, Line 91, delete "can" and insert --to--
Claim 1, Line 101, delete "and" and insert --an--
Claim 8, Line 24, after "unnecessary" insert --records, files, or profiles--
Claim 8, Line 31, replace "publically" with --publicly--
Claim 8, Line 73, after "conducted" insert --by--
Claim 8, Line 91, delete "can" and insert --to--
Claim 8, Line 100, delete "and" and insert --an--
Claim 18, Line 29, after "unnecessary" insert --records, files, or profiles--
Claim 18, Line 36, replace "publically" with --publicly--
Claim 18, Line 74, after "conducted" insert --by--
Claim 24, Line 29, after "unnecessary" insert --records, files, or profiles--
Claim 24, Line 36, replace "publically" with --publicly--
Claim 24, Line 74, after "conducted" insert --by--

Signed and Sealed this
Fifteenth Day of November, 2022

Katherine Kelly Vidal
*Director of the United States Patent and Trademark Office*